(12) United States Patent
Zhang et al.

(10) Patent No.: US 12,060,240 B2
(45) Date of Patent: Aug. 13, 2024

(54) ROLLER ASSEMBLY, BATTERY CELL MANUFACTURING DEVICE, AND ADJUSTMENT METHOD OF ROLLER

(71) Applicant: CONTEMPORARY AMPEREX TECHNOLOGY CO., LIMITED, Ningde (CN)

(72) Inventors: Yongli Zhang, Ningde (CN); Jun Hu, Ningde (CN); Gang Zeng, Ningde (CN); Keqiang Li, Ningde (CN); Ruhu Liao, Ningde (CN); Zhihua Wen, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/360,815

(22) Filed: Jul. 28, 2023

(65) Prior Publication Data
US 2023/0369634 A1 Nov. 16, 2023

Related U.S. Application Data

(63) Continuation of application No. PCT/CN2022/106092, filed on Jul. 15, 2022.

(30) Foreign Application Priority Data

Aug. 31, 2021 (CN) .......................... 202111017052.6

(51) Int. Cl.
*B65H 23/038* (2006.01)
*B65H 23/025* (2006.01)
*H01M 10/04* (2006.01)

(52) U.S. Cl.
CPC ......... *B65H 23/038* (2013.01); *B65H 23/025* (2013.01); *B65H 23/0253* (2013.01);
(Continued)

(58) Field of Classification Search
CPC .............. B65H 23/025; B65H 23/0251; B65H 23/0253; B65H 23/0258; B65H 23/038;
(Continued)

(56) References Cited

U.S. PATENT DOCUMENTS

| | | | | |
|---|---|---|---|---|
| 2,331,030 A | * | 10/1943 | King | ................... B65H 23/038 |
| | | | | 226/22 |
| 2,797,091 A | * | 6/1957 | Fife | ................... B65H 23/0204 |
| | | | | 226/22 |

(Continued)

FOREIGN PATENT DOCUMENTS

| | | |
|---|---|---|
| CN | 2356848 Y | 1/2000 |
| CN | 203114822 U | 8/2013 |

(Continued)

OTHER PUBLICATIONS

International Search Report received in the corresponding International Application PCT/CN2022/106092, mailed Sep. 9, 2022.

(Continued)

*Primary Examiner* — Michael R Mansen
*Assistant Examiner* — Raveen J Dias
(74) *Attorney, Agent, or Firm* — Kilpatrick Townsend & Stockton LLP

(57) ABSTRACT

Provided are a roller assembly, a battery cell manufacturing device, and an adjustment method of a roller, which relates to the field of battery manufacturing technology. The roller assembly includes a holder, a roller, and a first adjusting member. The roller is rotatably mounted on the holder. The first adjusting member is rotatably mounted on the holder, and one end of the roller is rotatably connected to the first adjusting member. A rotation axis of the roller does not coincide with a rotation axis of the first adjusting member. One end of the roller is rotatably mounted on the holder through the first adjusting member. The rotation axis of the (Continued)

first adjusting member does not coincide with the rotation axis of the roller, and therefore, rotation of the first adjusting member is capable of driving a corresponding end of the roller to rotate, thereby adjusting an extension direction of the roller.

16 Claims, 12 Drawing Sheets

(52) U.S. Cl.
CPC ..... *H01M 10/0404* (2013.01); *B65H 2404/15* (2013.01); *B65H 2801/72* (2013.01)

(58) Field of Classification Search
CPC .......... B65H 2404/15; B65H 2404/152; B65H 2404/1521; B65H 2701/19; B65H 20/02; B65H 16/04; B65H 16/06; B65H 18/026; B65H 18/028; H01M 10/0404; H01M 10/0409
See application file for complete search history.

(56) References Cited

U.S. PATENT DOCUMENTS

| | | | | |
|---|---|---|---|---|
| 3,107,036 A * | 10/1963 | Alexeff | .................... | D06C 3/00 226/22 |
| 3,392,431 A * | 7/1968 | Bisang | .................... | D06C 3/067 26/99 |
| 3,436,002 A * | 4/1969 | Racine | .................. | B65H 23/032 226/23 |
| 3,958,736 A * | 5/1976 | Pounds | .................. | B65H 23/02 242/615.1 |
| 4,196,803 A * | 4/1980 | Lovett | .................. | B65G 39/071 198/806 |
| 4,223,426 A * | 9/1980 | Demiere | .................. | D06C 3/06 26/103 |
| 4,410,122 A * | 10/1983 | Frye | .................... | B65H 23/0258 26/102 |
| 4,762,311 A * | 8/1988 | Hertrich | ............... | B65H 23/038 270/41 |
| 4,960,234 A * | 10/1990 | Focke | .................. | B65H 23/038 83/73 |
| 5,078,263 A * | 1/1992 | Thompson | ........... | G03G 15/755 198/806 |
| 5,517,736 A * | 5/1996 | Dalla Vecchia | ... | B65H 23/1888 26/34 |
| 5,526,557 A * | 6/1996 | Dalla Vecchia | ..... | B65H 23/038 26/29 P |
| 5,528,804 A * | 6/1996 | Dalla Vecchia | ....... | D06C 11/00 26/29 R |
| 5,555,611 A * | 9/1996 | Lyczek | .................. | D06H 3/125 26/102 |
| 5,727,753 A * | 3/1998 | Harris | .................. | B65H 23/038 242/615.1 |
| 5,833,106 A * | 11/1998 | Harris | .................... | B65H 27/00 226/17 |
| 5,833,171 A * | 11/1998 | Harris | ................ | B65H 23/0251 242/615.1 |
| 5,921,452 A * | 7/1999 | Wulf | .................... | B65H 23/038 242/563.1 |
| 6,105,899 A * | 8/2000 | Harris | .................. | B65H 23/038 226/23 |
| 6,116,159 A * | 9/2000 | Koyama | .................. | B41F 13/08 101/228 |
| 6,789,476 B2 * | 9/2004 | Langsch | ............... | B65H 23/025 492/30 |
| 6,829,992 B2 * | 12/2004 | Kobayashi | ........... | B65H 23/038 101/228 |
| 6,830,212 B1 * | 12/2004 | Harris | .................. | B65H 23/038 226/23 |
| 6,981,583 B1 * | 1/2006 | Donnenhoffer | ........ | B65G 39/16 198/810.03 |
| 7,824,320 B2 * | 11/2010 | Kerschbaumer | ..... | D21G 1/0213 492/1 |
| 8,241,192 B2 * | 8/2012 | Sano | ....................... | B29C 43/24 492/15 |
| 8,474,675 B2 * | 7/2013 | Haehnel | ............... | B65H 23/038 226/3 |
| 11,180,335 B2 * | 11/2021 | De Gaillande | ........ | B65H 16/00 |
| 11,261,044 B2 * | 3/2022 | Takato | ............... | H04N 1/00602 |
| 2003/0226457 A1 * | 12/2003 | Langsch | ............... | B65H 23/025 101/232 |
| 2003/0226459 A1 * | 12/2003 | Langsch | ................. | B41F 13/02 101/484 |
| 2004/0003732 A1 * | 1/2004 | Kobayashi | ........... | B65H 23/038 101/228 |
| 2008/0210733 A1 * | 9/2008 | Kerschbaumer | ... | B65H 23/0251 226/194 |
| 2010/0249985 A1 * | 9/2010 | Haehnel | ............... | B65H 23/038 700/213 |
| 2011/0206440 A1 * | 8/2011 | Muir | .................... | B65H 23/038 400/618 |
| 2012/0118186 A1 * | 5/2012 | Nishiyama | ......... | B65H 23/0322 101/248 |
| 2016/0272449 A1 * | 9/2016 | Ito | ........................ | B41J 11/0025 |
| 2020/0198910 A1 * | 6/2020 | Takato | ................. | H04N 1/0057 |
| 2021/0245985 A1 * | 8/2021 | De Gaillande | ........ | B65H 20/24 |
| 2023/0119768 A1 * | 4/2023 | Lee | ...................... | B65H 23/048 242/520 |

FOREIGN PATENT DOCUMENTS

| | | | | | |
|---|---|---|---|---|---|
| CN | 107285084 A | * | 10/2017 | ......... | B65H 23/1888 |
| CN | 108820977 A | * | 11/2018 | ............. | B65H 23/26 |
| CN | 110104472 A | * | 8/2019 | .......... | B65H 23/038 |
| CN | 214003545 U | | 8/2021 | | |
| DE | 202013003546 U1 | * | 8/2013 | .......... | B65H 23/025 |
| JP | 2002287263 A | | 10/2002 | | |
| KR | 102095262 B1 | * | 3/2020 | ......... | B65H 2404/15 |
| KR | 20220032734 A | * | 3/2022 | ........ | H01M 10/0404 |
| WO | WO-2013164920 A1 | * | 11/2013 | .......... | B65H 23/038 |
| WO | WO-2017010002 A1 | * | 1/2017 | .......... | B65H 23/025 |

OTHER PUBLICATIONS

Written Opinion received in the corresponding International Application PCT/CN2022/106092, mailed Sep. 9, 2022.

* cited by examiner

200

ROLLER ASSEMBLY, BATTERY CELL MANUFACTURING DEVICE, AND ADJUSTMENT METHOD OF ROLLER

CROSS-REFERENCE TO RELATED APPLICATIONS

The present application is a continuation of International Application PCT/CN2022/106092, filed Jul. 15, 2022, which claims priority to Chinese Patent Application No. 202111017052.6 filed on Aug. 31, 2021 and entitled "ROLLER ASSEMBLY, BATTERY CELL MANUFACTURING DEVICE, AND ADJUSTMENT METHOD OF ROLLER," which are incorporated herein by reference in their entireties.

TECHNICAL FIELD

The present application relates to the field of battery manufacturing technologies, and in particular, to a roller assembly, a battery cell manufacturing device, and an adjustment method of a roller.

BACKGROUND

A roller assembly is used for transporting a band-shaped substrate, and the band-shaped substrate is generally required to be transported stably to avoid occurrence of offset, fold, or turnover that may affect subsequent processing or the quality of finished products. For example, in a field of battery technologies, if an electrode sheet deviates, wrinkles, or folds during transportation, the quality of a subsequently cut tab will be affected, thus affecting the quality of a battery. The roller assembly usually includes a holder and a roller. The roller is mounted on the holder. The band-shaped substrate may be transported along a surface of the roller, and the roller rotates along with the transportation of the band-shaped substrate. With the use of the roller assembly, an extension direction of the roller may be changed, which may affect parallelism between rollers and the stability of the transportation of the band-shaped substrate, thereby affecting the yield of final products.

Therefore, how to adjust the extension direction of the roller to improve the stability of substrate transmission has become an urgent problem to be solved in the field of battery manufacturing technology.

SUMMARY OF THE INVENTION

A roller assembly, a battery cell manufacturing device, and an adjustment method of a roller are provided in embodiments of the present application of the present application, so as to facilitate adjustment of an extension direction of the roller, thereby improving the stability of substrate transmission.

In a first aspect, a roller assembly is provided in an embodiment of the present application, including a holder, a roller, and a first adjusting member. The roller is rotatably mounted on the holder. The first adjusting member is rotatably mounted on the holder, and one end of the roller is rotatably connected to the first adjusting member. A rotation axis of the roller does not coincide with a rotation axis of the first adjusting member.

In the above technical solution, one end of the roller is rotatably mounted on the holder through the first adjusting member. The rotation axis of the first adjusting member does not coincide with the rotation axis of the roller, so that rotation of the first adjusting member is capable of driving a corresponding end of the roller to rotate so as to adjust an extension direction of the roller, so that the extension direction of the roller meets a transmission requirement, thereby ensuring the transferring stability. Moreover, a rotation range of the first adjusting member is 0° to 360°, so that the extension direction of the roller has a larger adjustment range and higher adjustment accuracy.

In some embodiments of the first aspect, the roller assembly further includes a second adjusting member, the first adjusting member is mounted on the holder through the second adjusting member, the second adjusting member is rotatably mounted on the holder, and the first adjusting member is rotatably mounted on the second adjusting member. A rotation axis of the second adjusting member does not coincide with the rotation axis of the first adjusting member.

In the above technical solution, the first adjusting member is mounted on the holder through the second adjusting member, and the second adjusting member is rotatably mounted on the holder; therefore, the extension direction of the roller may be adjusted only by rotating the first adjusting member or the second adjusting member, or the extension direction of the roller may be adjusted jointly by the first adjusting member and the second adjusting member, so that the extension direction of the roller has a larger adjustment range and higher adjustment accuracy.

In some embodiments of the first aspect of the present application, the second adjusting member is provided with a mounting hole, and the mounting hole is used for mounting the first adjusting member.

In the above technical solution, the second adjusting member is provided with the mounting hole for mounting the first adjusting member. In other words, the first adjusting member is mounted in the mounting hole, and the first adjusting member is at least partially accommodated in the mounting hole, which is capable of reducing the overall size of the first adjusting member and the second adjusting member after mounting, thereby reducing the overall size of the roller assembly.

In some embodiments of the first aspect of the present application, the second adjusting member sleeves the first adjusting member peripherally.

In the above technical solution, the second adjusting member sleeves the first adjusting member peripherally, and therefore, the first adjusting member is completely accommodated in the mounting hole circumferentially, which is capable of reducing the overall size of the first adjusting member and the second adjusting member after mounting, thereby reducing the overall size of the roller assembly.

In some embodiments of the first aspect of the present application, an outer circumferential surface of the first adjusting member forms a rotational fit with the wall of the mounting hole.

In the above technical solution, the outer circumferential surface of the first adjusting member forms the rotational fit with the hole wall of the mounting hole, which is equivalent to that the outer circumferential surface of the first adjusting member directly contacts with the hole wall of the mounting hole and forms the rotational fit. Therefore, it is possible to achieve the rotational fit between the outer circumferential surface of the first adjusting member and the hole wall of the mounting hole without arranging a connecting element between the outer circumferential surface of the first adjusting member and the hole wall of the mounting hole, and therefore, a structure and an assembly process of the roller assembly are simplified, the manufacturing cost is saved, and a mounting error between the first adjusting member and the second adjusting member is reduced to improve the adjustment accuracy.

In some embodiments of the first aspect of the present application, the roller assembly includes a first locking mechanism, and the first locking mechanism is configured to lock the second adjusting member and the holder.

In the above technical solution, the first locking mechanism is configured to lock the second adjusting member and the holder. When the second adjusting member adjusts the roller to an appropriate extension direction, locking the second adjusting member and the holder by the first locking mechanism is capable of fixing the second adjusting member relative to the holder, thereby keeping the roller in an adjusted position and stable, and improving the stability of transferring.

In some embodiments of the first aspect of the present application, the first locking mechanism includes a first locking member. The holder is provided with a first locking hole, and the second adjusting member is provided with a second locking hole. The first locking member is configured to be inserted into the first locking hole and the second locking hole to lock the second adjusting member and the holder.

In the above technical solution, the first locking member cooperates with the first locking hole on the holder and the second locking hole on the second adjusting member to lock the second adjusting member and holder. The locking method is simple, and the arrangement of the first locking hole and the second locking hole is further capable of reducing the weight of the holder and the second adjusting member.

In some embodiments of the first aspect of the present application, the roller assembly further includes a second locking mechanism, and the second locking mechanism is configured to lock the first adjusting member and the second adjusting member.

In the above technical solution, the second locking mechanism is configured to lock the second adjusting member and the first adjusting member. When the first adjusting member adjusts the roller to an appropriate extension direction, locking the second adjusting member and the first adjusting member through the second locking mechanism is capable of fixing the first adjusting member relative to the second adjusting member, thereby keeping the roller in an adjusted position and stable, and improving the stability of transferring.

In some embodiments of the first aspect of the present application, the second locking mechanism includes a second locking member. The second adjusting member is provided with a third locking hole, and the first adjusting member is provided with a fourth locking hole. The second locking member is configured to be inserted into the third locking hole and the fourth locking hole to lock the first adjusting member and the holder.

In the above technical solution, the second locking member cooperates with the third locking hole on the second adjusting member and the fourth locking hole on the first adjusting member to lock the first adjusting member and the holder. The locking method is simple, and the arrangement of the third locking hole and the fourth locking hole is further capable of reducing the weight of the second adjusting member and the first adjusting member.

In some embodiments of the first aspect of the present application, an axis of the second adjusting member coincides with the rotation axis of the second adjusting member.

In the above technical solution, the axis of the second adjusting member coincides with the rotation axis of the second adjusting member, and therefore, the second adjusting member has a regular structure and is more convenient for adjustment.

In some embodiments of the first aspect of the present application, the first adjusting member is provided with an assembling hole, and the assembling hole is configured to mount the roller.

In the above technical solution, the first adjusting member is provided with the assembling hole for mounting the roller. In other words, one end of the roller is mounted in the assembling hole, and the overall size of the first adjusting member and the roller after mounting is capable of being reduced, thereby reducing the overall size of the roller assembly.

In some embodiments of the first aspect of the present application, a distance between a central axis of the assembling hole and the rotation axis of the first adjusting member is equal to a distance between a central axis of the mounting hole and the rotation axis of the second adjusting member.

In the above technical solution, the distance between the central axis of the assembling hole and the rotation axis of the first adjusting member is equal to the distance between the central axis of the mounting hole and the rotation axis of the second adjusting member, and therefore, under cooperation of the first adjusting member and the second adjusting member, one end of the roller mounted on the first adjusting member is capable of being adjusted to any position in a circle with a radius being the sum of the distance between the central axis of the assembling hole and the rotation axis of the first adjusting member and the distance between the central axis of the mounting hole and the rotation axis of the second adjusting member, so that the extension direction of the roller has a larger adjustment range and higher adjustment accuracy.

In some embodiments of the first aspect of the present application, an axis of the outer circumferential surface of the first adjusting member coincides with the rotation axis of the first adjusting member.

In the above technical solution, the axis of the outer circumferential surface of the first adjusting member coincides with the rotation axis of the first adjusting member, and therefore, the first adjusting member has a regular structure and is more convenient for mounting and adjustment.

In some embodiments of the first aspect of the present application, the roller assembly includes a third locking mechanism, and the third locking mechanism is configured to lock the first adjusting member and the holder.

In the above technical solution, the third locking mechanism is configured to lock the first adjusting member and the holder. When a third adjusting member adjusts the roller to an appropriate extension direction, locking the second adjusting member and the holder by the first locking mechanism is capable of fixing the first adjusting member relative to the holder, thereby keeping the roller in an adjusted position and stable, and improving the stability of transferring.

In some embodiments of the first aspect of the present application, the roller assembly includes two first adjusting members, and both ends of the roller are mounted on the holder through the two first adjusting members respectively.

In the above technical solution, both ends of the roller are respectively mounted on the holder through the first adjusting member, and therefore, the extension direction of the roller may be adjusted through the first adjusting member at any end, providing more options for the adjustment of the extension direction of the roller, which is convenient to choose, according to an actual use environment, an end of the roller for adjustment. The first adjusting members at both ends of the roller may also be adjusted at the same time. The two first adjusting members cooperate to adjust the extension direction of the roller, which is capable of improving the adjustment efficiency.

In some embodiments of the first aspect of the present application, the roller assembly further includes a measuring member, the measuring member is mounted on the holder, and the measuring member is configured to measure a rotation angle of the first adjusting member.

In the above technical solution, the arrangement of the measuring member is convenient for measuring the rotation angle of the first adjusting member. In the case of a plurality of roller assemblies, the measuring member is further capable of providing a reference for adjustment of an extension direction of a roller of another roller assembly, so as to ensure that the extension directions of various rollers are consistent, thereby improving the transferring stability.

In a second aspect, a battery cell manufacturing device is provided in an embodiment of the present application, including a feeding apparatus and the roller assembly provided in the embodiment of the first aspect. The feeding apparatus is used for providing an electrode sheet. The roller of the roller assembly is configured to transfer the electrode sheet.

In the above technical solution, the roller of the roller assembly is capable of rotatably adjusting its extension direction through the first adjusting member, so that the extension direction of the roller meets transferring requirements, thus ensuring the transferring stability. Moreover, the rotation range of the first adjusting member is 0° to 360°, so that the extension direction of the roller has a larger adjustment range and higher adjustment accuracy.

In the third aspect, an adjustment method of a roller is provided in an embodiment of the present application, including:

providing a holder, a roller, and a first adjusting member;

rotatably mounting the roller and the first adjusting member on the holder, and rotatably mounting one end of the roller to the first adjusting member, so that a rotation axis of the roller does not coincide with a rotation axis of the first adjusting member; and rotating the first adjusting member to adjust an extension direction of the roller.

In the above technical solution, the extension direction of the roller is adjusted by rotating the first adjusting member so that the extension direction of the roller meets transferring requirements, thus ensuring the transferring stability. Moreover, the rotation range of the first adjusting member is 0° to 360°, so that the extension direction of the roller has a larger adjustment range and higher adjustment accuracy.

DESCRIPTION OF DRAWINGS

To more clearly describe the technical solutions of the embodiments of the present application, the drawings to be used in the embodiments will be briefly introduced below, and it should be understood that the following drawings only show some embodiments of the present application, and therefore should not be considered as limiting the scope of the present application. For those of ordinary skills in the art, other relevant drawings may also be obtained based on these drawings without creative efforts.

Figure 1:
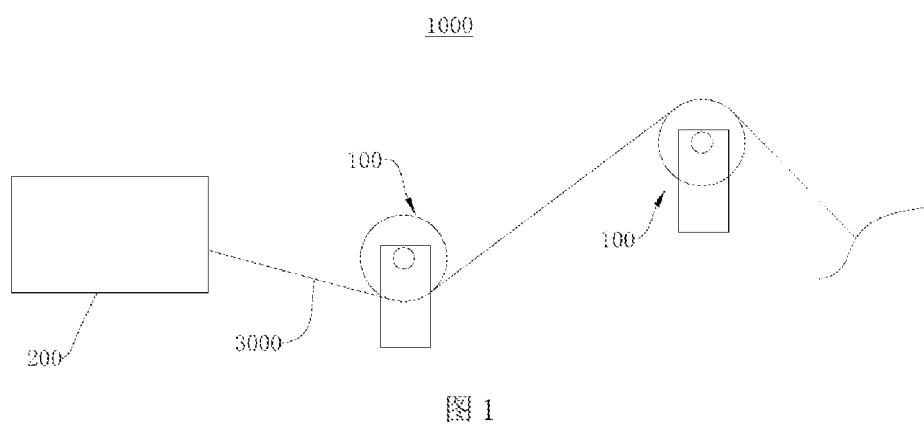
FIG. 1 is a simplified structural diagram of a battery cell manufacturing device according to some embodiments of the present application.

Reference numerals: 1000—Battery cell manufacturing device; 100—Roller assembly; 10—Holder; 11—First mounting portion; 111—Second accommodating hole; 112—First locking hole; 12—Second mounting portion; 13—Third mounting portion; 131—First accommodating hole; 20—Roller; 21—Shaft; 22—Sleeve; 221—First position-limit portion; 222—Second position-limit portion; 23—First bearing; 24—Second bearing; 25—First position-limit member; 26—Second position-limit member; 30—First adjusting member; 31—Third rotating portion; 311—Outer circumferential surface of third rotating portion; 32—Fourth rotating portion; 321—Outer circumferential surface of fourth rotating portion; 33—Assembling hole; 34—Fourth locking hole; 35—First identification; 36—First handle hole; 40—Third bearing; 50—Third position-limit member; 60—Protective base; 61—Accommodating cavity;

62—First part; 63—Second part; 70—Second adjusting member; 71—First rotating portion; 711—Outer circumferential surface of first rotating portion; 72—Second rotating portion; 721—Outer circumferential surface of second rotating portion; 73—Mounting hole; 74—Second locking hole; 75—Third locking hole; 76—Second identification; 77—Second handle hole; 80—First locking mechanism; 81—First locking member; 90—Second locking mechanism; 91—Second locking member; 110—Fourth bearing; 120—Fourth position-limit member; 150—Measuring member; 200—Feeding apparatus; A1—Rotation axis of first adjusting member; A2—Rotation axis of second adjusting member; A3—Central axis of mounting hole; A4—Central axis of assembling hole; 3000—Electrode sheet.

DETAILED DESCRIPTION

For the objects, technical solutions and advantages of the embodiments of the present application to be clearer, the technical solutions in the embodiments of the present application will be clearly and completely described below in conjunction with the drawings in the embodiments of the present application, and it is apparent that the described embodiments are a part of the embodiments of the present application rather than all the embodiments. The assembly of the embodiments of the present application generally described and illustrated in the drawings herein can be arranged and designed in a variety of different configurations.

Therefore, the following detailed description of the embodiments of the present application provided in the accompanying drawings is not intended to limit the claimed scope of the present application, but merely represents selected embodiments of the present application. Based on the embodiments in the present application, all other examples obtained by those of ordinary skill in the art without creative effort fall within the protection scope of the present application.

It should be noted that in case of no conflicts, the features of the embodiments in the present application may be combined with each other.

It should be noted that like reference numerals and letters denote similar items in the following figures, and therefore, once an item is defined in one figure, it does not require further definition and explanation in subsequent figures.

In the description of the embodiments of the present application, it is to be noted that, indicated orientation or positional relationships are based on the orientation or positional relationships shown in the drawings, or orientation or positional relationships at which the applied product is usually placed during use, or orientation or positional relationships usually understood by those skilled in the art, and are only for facilitating the description of the present application and simplifying the description, rather than indicating or implying that the apparatus or element referred to must have a particular orientation or be constructed and operated in a particular orientation, and therefore will not be interpreted as limiting the present application. In addition, the terms "first," "second," and "third" are used for descriptive purposes only, and cannot be construed as indicating or implying relative importance.

Roller assemblies are widely used in production and manufacturing fields, and are capable of transferring products or assisting in transferring of products. For some band-shaped products, roller assemblies are also capable of changing a transfer direction of the products.

The inventor noted that there is a deviation between an axis of a roller and a reference axis due to a mounting error of the roller assembly or wear during use. The roller needs to be adjusted to change an extension direction of the roller, so as to reduce the deviation between the axis of the roller and the reference axis and improve the transferring stability of the roller. At present, a method of adjusting an axis direction of the roller mainly refers to bolt adjustment. The adjustment accuracy and adjustment range of the bolt are limited, and the bolt is worn after multiple adjustments, further reducing the adjustment accuracy.

Based on the above considerations, in order to solve problems of low adjustment accuracy, limited adjustment range, and easy wear existing in adjustment of the extension direction of the roller by a bolt, the inventor has designed a roller assembly through in-depth research. One end of the roller is rotatably mounted on the holder through the first adjusting member. A rotation axis of the first adjusting member does not coincide with a rotation axis of the roller, and therefore, rotation of the first adjusting member is capable of driving a corresponding end of the roller to rotate so as to adjust the extension direction of the roller, so that the extension direction of the roller meets a transferring requirement, thereby ensuring the transferring stability. Moreover, a rotation range of the first adjusting member is 0° to 360°, so that the extension direction of the roller has a larger adjustment range and higher adjustment accuracy.

The roller assembly according to the embodiment of the present application may be used not only in the field of battery manufacturing technologies, but also in other fields where the roller assembly is required to participate in transferring, such as the field of textile technologies.

The embodiment of the present application introduces the roller assembly by taking the roller assembly used in the field of battery manufacturing technologies as an example.

For the convenience of description, description is made by taking a battery cell manufacturing device as an example in the embodiments of the present application.

Referring to FIG. 1, FIG. 1 is a simplified structural diagram of a battery cell manufacturing device 1000 according to some embodiments of the present application. The battery cell manufacturing device 1000 includes a roller assembly 100 and a feeding apparatus 200, and the feeding apparatus 200 is used for providing an electrode sheet 3000. Roller assembly 100 is used for transferring the electrode sheet 3000 so as to transfer the electrode sheet 3000 to the next station.

In some embodiments, the battery cell manufacturing device 1000 may include a plurality of roller assemblies 100, and the plurality of roller assemblies 100 are arranged at intervals. The electrode sheet 3000 is sequentially wound on surfaces of rollers 20 (shown in FIG. 2) of the plurality of roller assemblies 100, and the plurality of roller assemblies 100 jointly realize the transferring of the electrode sheet 3000 to the next station.

Figure 2:
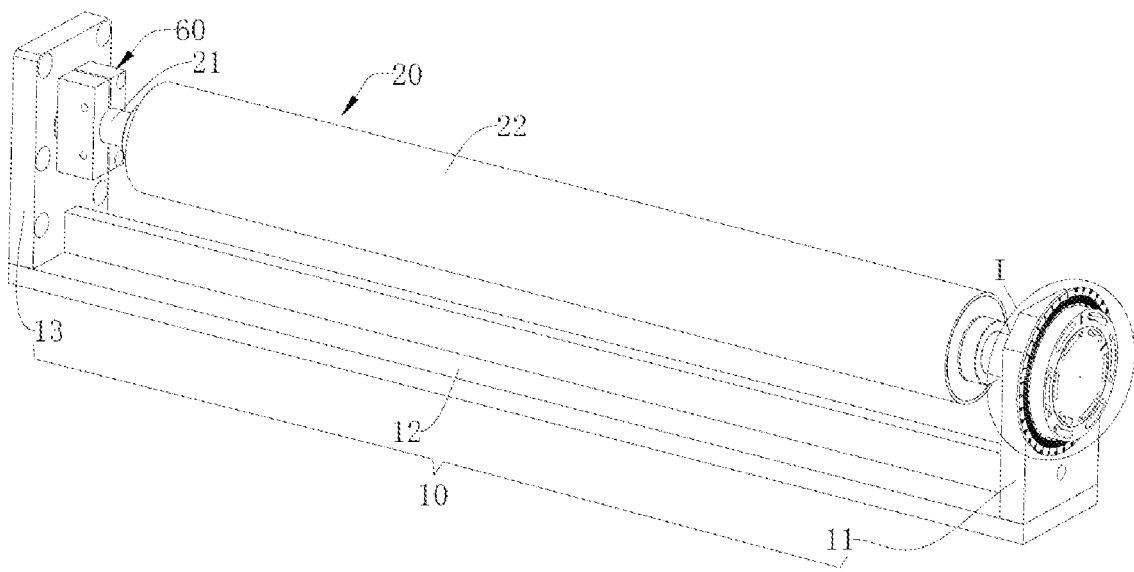
FIG. 2 is a schematic structural diagram of a roller assembly according to some embodiments of the present application.
Figure 3:
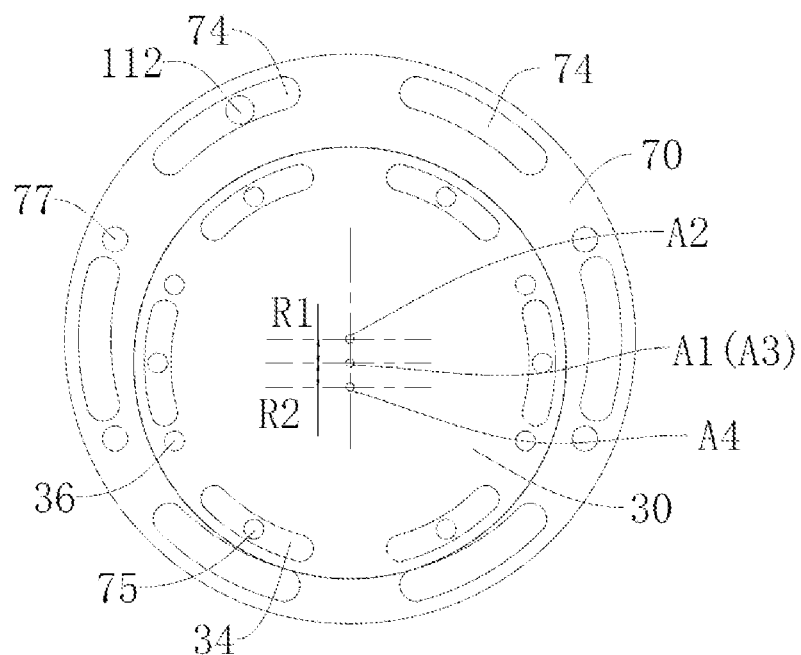
FIG. 3 is an axial diagram of a roller assembly according to some embodiments of the present application (a holder is not shown)
Figure 4:
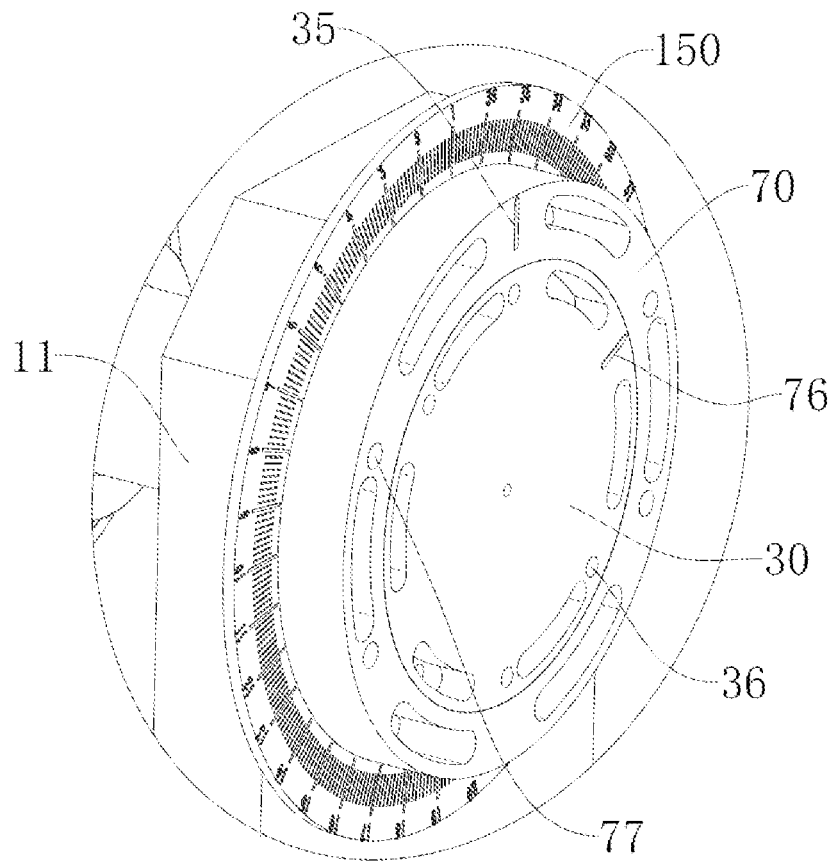
FIG. 4 is an enlarged diagram at position I in FIG. 2.

As shown in FIG. 2, FIG. 3, and FIG. 4, FIG. 2 is a schematic structural diagram of a roller assembly 100 according to some embodiments of the present application, FIG. 3 is an axial view of a roller assembly 100 according to some embodiments of the present application (a holder 10 is not shown), and FIG. 4 is an enlarged diagram at position I in FIG. 2. In some embodiments, the roller assembly 100 includes a holder 10, a roller 20, and a first adjusting member 30. The roller 20 is rotatably mounted on the holder 10. The first adjusting member 30 is rotatably mounted on the holder 10, and one end of the roller 20 is rotatably connected to the first adjusting member 30. A rotation axis of the roller 20 does not coincide with a rotation axis A1 of the first adjusting member.

The rotation axis A1 of the first adjusting member does not coincide with the rotation axis of the roller 20. In other words, the rotation axis A1 of the first adjusting member and the axis of the roller 20 may intersect, be parallel, or be non-coplanar.

The rotation axis A1 of the first adjusting member is an axis around which the first adjusting member 30 rotates, and the rotation axis of the roller 20 is an axis around which the roller 20 rotates.

One end of the roller 20 is rotatably mounted on the holder 10 through the first adjusting member 30. The rotation axis A1 of the first adjusting member does not coincide with the rotation axis of the roller 20, and therefore, rotation of the first adjusting member 30 is capable of driving a corresponding end of the roller 20 to rotate so as to adjust an extension direction of the roller 20, so that the extension direction of the roller 20 meets a transferring requirement, thereby ensuring the transferring stability. Moreover, a rotation range of the first adjusting member 30 is 0° to 360°, so that the extension direction of the roller 20 has a larger adjustment range and higher adjustment accuracy.

Figure 5:
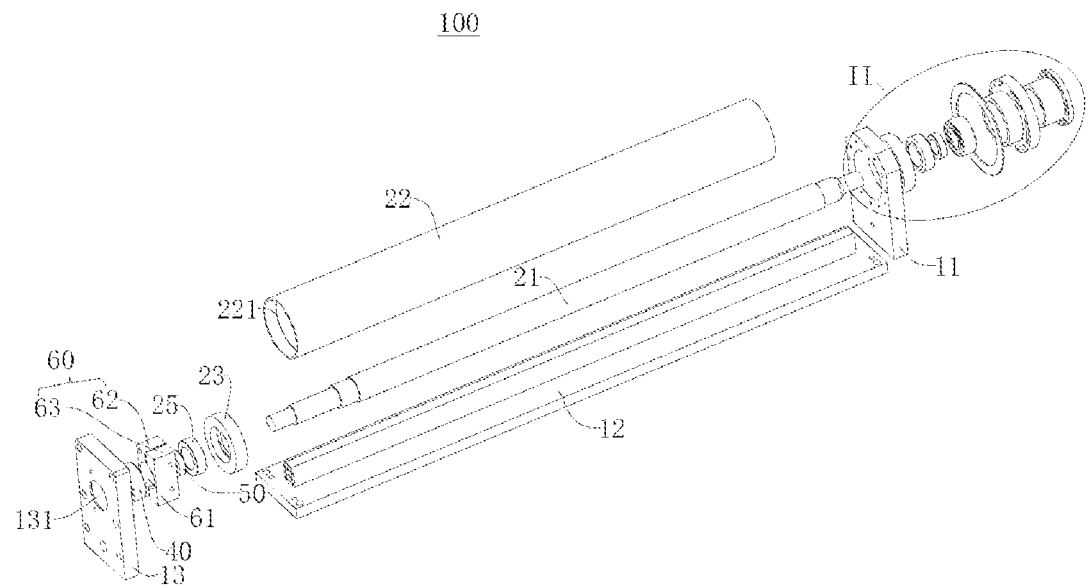
FIG. 5 is an exploded diagram of a roller assembly according to some embodiments of the present application.

As shown in FIG. 5, FIG. 5 is an exploded diagram of a roller assembly 100 according to some embodiments of the present application. The holder 10 includes a first mounting portion 11, a second mounting portion 12, and a third mounting portion 13 connected in sequence. The first mounting portion 11 and the third mounting portion 13 are arranged oppositely. The first mounting portion 11, the second mounting portion 12, and the third mounting portion 13 jointly define a U-shaped holder 10. The roller 20 is mounted between the first mounting portion 11 and the third mounting portion 13, and both ends of the roller 20 are mounted on the first mounting portion 11 and the third mounting portion 13 respectively.

Figure 6:
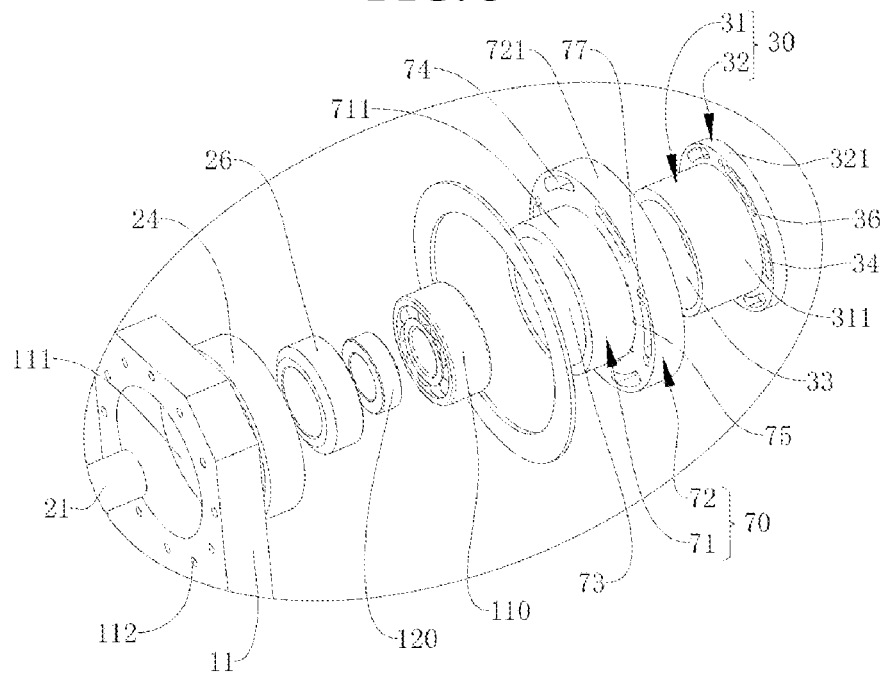
FIG. 6 is an enlarged diagram at position II in FIG. 5.

As shown in FIG. 5 and FIG. 6, FIG. 6 is an enlarged diagram at position II in FIG. 5. In some embodiments, the roller 20 includes a shaft 21 and a sleeve 22 sleeving the shaft 21 peripherally. Both ends of the shaft 21 extend beyond axial ends of the sleeve 22. The sleeve 22 is arranged coaxially with the shaft 21. The sleeve 22 may rotatably sleeve the shaft 21 peripherally. In an axial direction of the roller 20, the roller 20 includes a first bearing 23 and a second bearing 24 arranged at an interval. both the first bearing 23 and the second bearing 24 sleeve the shaft 21 peripherally. The sleeve 22 sleeves the first bearing 23 and the second bearing 24 peripherally. The sleeve 22 realizes indirect rotational connection with the shaft 21 through the first bearing 23 and the second bearing 24.

Figure 7:
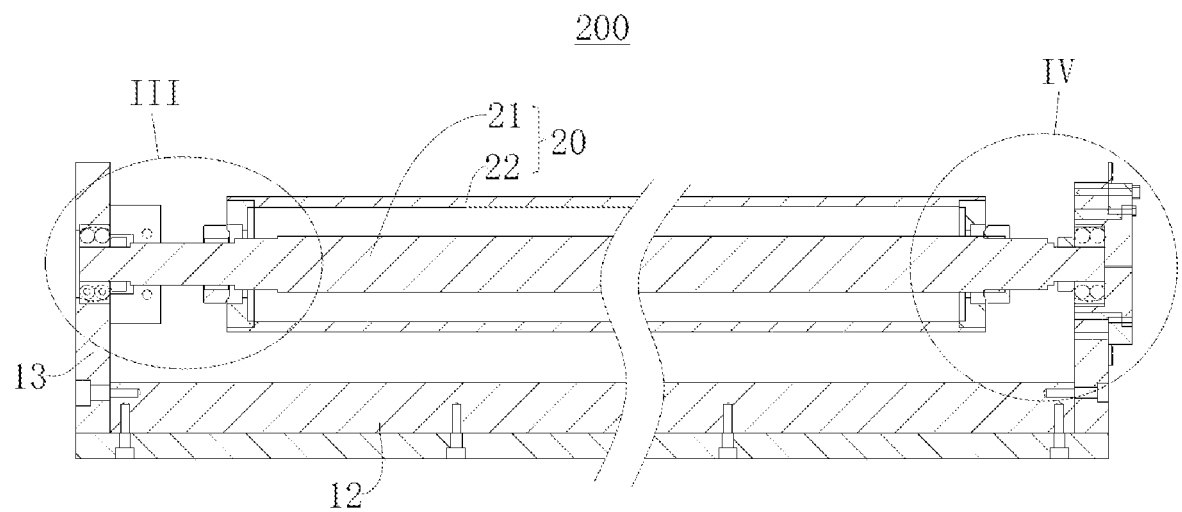
FIG. 7 is a sectional diagram of a roller assembly according to some embodiments of the present application.
Figure 8:
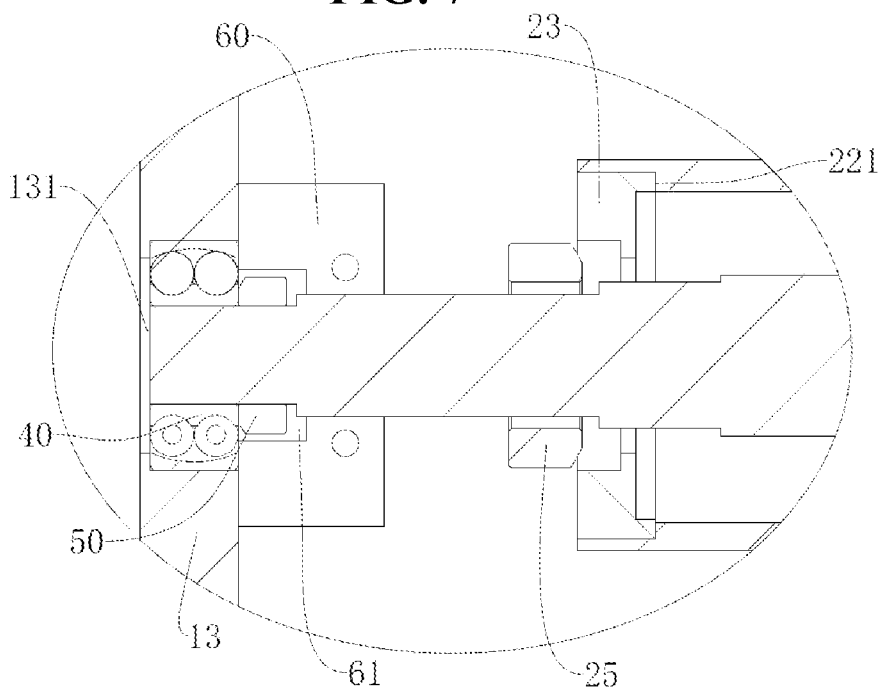
FIG. 8 is an enlarged diagram at position III in FIG. 7.
Figure 9:
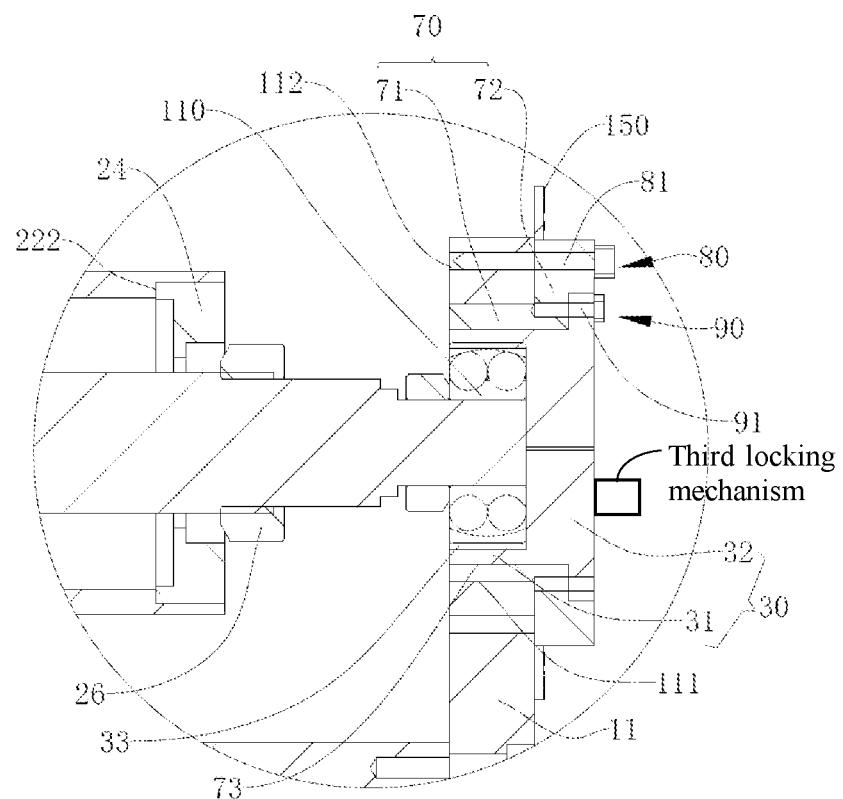
FIG. 9 is an enlarged diagram at position IV in FIG. 7.

As shown in FIG. 7 to FIG. 9, FIG. 7 is a sectional diagram of a roller assembly 100 according to some embodiments of the present application, FIG. 8 is an enlarged diagram at position III in FIG. 7, and FIG. 9 is an enlarged diagram at position IV in FIG. 7. In some embodiments, an inner wall of the sleeve 22 is provided with a first position-limit portion 221 and a second position-limit portion 222. The first position-limit portion 221 is used for abutting against one end of the first bearing 23 in the axial direction to limit movement of the first bearing 23 in a direction facing the second bearing 24, and the second position-limit portion 222 is used for abutting against one end of the second bearing 24 in the axial direction to limit movement of the second bearing 24 in a direction facing the first bearing 23.

As shown in FIG. 8 and FIG. 9, the roller 20 further includes a first position-limit member 25 and a second position-limit member 26. Both the first position-limit member 25 and the second position-limit member 26 are fixed on the outer circumference of the shaft 21. The first position-limit member 25 is arranged on one side of the first bearing 23 away from the first position-limit portion 221, and is used for abutting against the end of the first bearing 23 away from the first position-limit portion 221, so as to limit the movement of the first bearing 23 in a direction away from the second bearing 24. The first position-limit member 25 and the first position-limit portion 221 cooperate to limit a position of the first bearing 23 in the axial direction. The second position-limit member 26 is arranged on a side of the second bearing 24 away from the second position-limit portion 222, and is used for abutting against the end of the second bearing 24 away from the second position-limit portion 222, so as to limit the movement of the second bearing 24 in a direction away from the first bearing 23. The second position-limit member 26 and the second position-limit portion 222 cooperate to limit a position of the second bearing 24 in the axial direction. the first position-limit member 25 and the second position-limit member 26 are both position-limit rings sleeving the shaft 21 peripherally. Of course, in other embodiments, the first position-limit member 25 and the second position-limit member 26 may also be of other structural forms.

In the embodiment where the roller 20 includes a shaft 21 and a sleeve 22, the roller 20 rotatably mounted on the holder 10 may be that two ends of the shaft 21 extending out of the sleeve 22 are rotatably mounted on the holder 10.

The roller 20 rotatably mounted on the holder 10 may be that the roller 20 is directly connected to the holder 10 or indirectly connected to the holder 10. In some embodiments, one end of the roller 20 is rotatably mounted on the holder 10 through the first adjusting member 30, and the other end of the roller 20 is rotatably connected to the holder 10 through a third bearing 40. The third bearing 40 includes a self-aligning bearing, and a raceway of the self-aligning bearing is spherical, which is capable of adapting to an angular deviation movement between axial centerlines of inner and outer raceways. In this embodiment, both ends of the roller 20 are indirectly rotatably mounted on the holder 10. A mounting position of one end of the roller 20 relative to the holder 10 is fixed, and a mounting position of one end of the roller 20 mounted to the holder 10 through the first adjusting member 30 relative to the holder 10 may be changed along with the rotation of the first adjusting member 30. In some other embodiments, both ends of the roller 20 in the axial direction may be rotatably connected to the holder 10 through the corresponding first adjusting member 30, and therefore, the extension direction of the roller 20 may be adjusted by rotating the first adjusting member 30 at either end of the roller 20, or the extension direction of the roller 20 may be jointly adjusted by rotating first adjusting members 30 at both ends of the roller 20. FIG. 4 and FIG. 5 show schematic structural diagrams of one end of the roller 20 rotatably mounted on the first mounting portion 11 through the first adjusting member 30 and the other end of the roller 20 rotatably mounted on the third mounting portion 13 through the third bearing 40.

As shown in FIG. 8, the third mounting portion 13 is provided with a first accommodating hole 131, and the third bearing 40 is mounted in the first accommodating hole 131. The roller assembly 100 further includes a third position-limit member 50, and the third position-limit member 50 fixedly sleeves the shaft 21 of the roller 20 peripherally. The third position-limit member 50 is used for limiting the position of the third bearing 40 in the axial direction to prevent an axial movement of the third bearing 40 relative to the holder 10. The roller assembly 100 further includes a protective base 60, and the protective base 60 is mounted on the third mounting portion 13. An accommodating cavity 61 for accommodating the third position-limit member 50 is formed inside the protective base 60. The protective base 60 includes a first part 62 and a second part 63. The first part 62 and the second part 63 are buckled in a radial direction of the third position-limit member 50 to form the accommodating cavity 61 for accommodating the third position-limit member 50.

The first adjusting member 30 rotatably mounted on the holder 10 may be that the first adjusting member 30 is rotatably mounted on the holder 10 directly, or may be that the first adjusting member 30 is rotatably mounted on the holder 10 indirectly.

Referring to FIG. 6, FIG. 8, and FIG. 9, in some embodiments, the roller assembly 100 further includes the second adjusting member 70, and the first adjusting member 30 is mounted on the holder 10 through the second adjusting member 70. The second adjusting member 70 is rotatably mounted on the holder 10, and the first adjusting member 30 is rotatably mounted on the second adjusting member 70. A rotation axis A2 (shown in FIG. 3) of the second adjusting member does not coincide with the rotation axis A1 (shown in FIG. 3) of the first adjusting member.

The rotation axis A2 of the second adjusting member is an axis around which the second adjusting member 70 rotates.

The second adjusting member 70 is rotatably mounted on the holder 10, and the first adjusting member 30 is rotatably mounted on the second adjusting member 70. In other words, the first adjusting member 30 is indirectly mounted on the holder 10 through the second adjusting member 70.

The second adjusting member 70 rotatably mounted on the holder 10 may be that the second adjusting member 70 is mounted on the holder 10 directly, or may be that the second adjusting member 70 is rotatably mounted on the holder 10 indirectly. In some embodiments, as shown in FIG. 9, the holder 10 may further be provided with a second accommodating hole 111 for mounting the second adjusting member 70. The second adjusting member 70 is accommodated in the second accommodating hole 111, and is capable of reducing the volume of the roller assembly 100. In some embodiments, the first mounting portion 11 may not be provided with the second accommodating hole 111, and the second adjusting member 70 is rotatably mounted on one side of the first mounting portion 11.

The rotation axis A2 of the second adjusting member does not coincide with the rotation axis A1 of the first adjusting member. In other words, the rotation axis A2 of the second adjusting member and the rotation axis A1 of the first adjusting member may intersect, be parallel, or be non-coplanar.

In the embodiment where both ends of the roller 20 in the axial direction are respectively mounted on the holder 10 through the first adjusting member 30, two first adjusting members 30 may be rotatably mounted on the second adjusting member 70 respectively.

Figure 10:
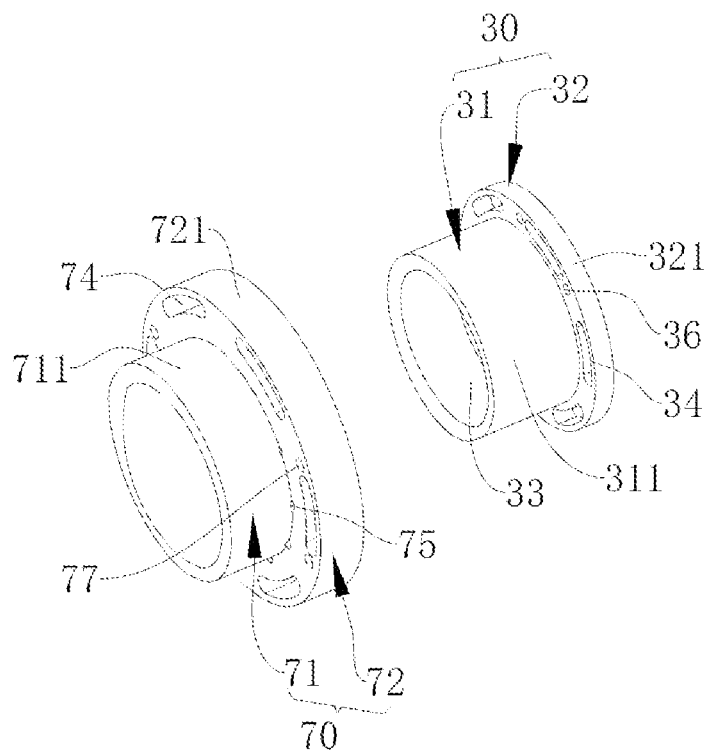
FIG. 10 is a schematic diagram of a first adjusting member 30 and a second adjusting member 70 before assembling.

As shown in FIG. 9 and FIG. 10, FIG. 10 is a schematic diagram showing that the first adjusting member 30 and the second adjusting member 70 are not assembled. In some embodiments, the second adjusting member 70 includes a first rotating portion 71 and a second rotating portion 72. The first rotating portion 71 is connected to the second rotating portion 72. The first rotating portion 71 is of a cylindrical structure, and the second rotating portion 72 is of a disc structure. A centerline of the outer circumferential surface 711 of the first rotating portion coincides with a centerline of an outer circumferential surface of the second rotating portion 72. The diameter of the outer circumferential surface 711 of the first rotating portion is smaller than the diameter of the outer circumferential surface 721 of the second rotating portion. The first rotating portion 71 is accommodated in the second accommodating hole 111, and the second rotating portion 72 is located outside the second accommodating hole 111 and located on one side of the first mounting portion 11 away from the third mounting portion 13.

In some embodiments, the second adjusting member 70 may also be of another structure, for example, the second adjusting member 70 is of a structure with outer circumferential surfaces having equal diameters.

The first adjusting member 30 is mounted on the holder 10 through the second adjusting member 70, and the second adjusting member 70 is rotatably mounted on the holder 10. Therefore, the extension direction of the roller 20 may be adjusted only by rotating the first adjusting member 30 or the second adjusting member 70, or the extension direction of the roller 20 may be adjusted jointly by the first adjusting member 30 and the second adjusting member 70, so that the extension direction of the roller 20 has a larger adjustment range and higher adjustment accuracy.

In some embodiments, the second adjusting member 70 is provided with a mounting hole 73, and the mounting hole 73 is used for mounting the first adjusting member 30.

In the embodiment where the second adjusting member 70 includes the first rotating portion 71 and the second rotating portion 72, the mounting hole 73 axially penetrates the first rotating portion 71 and the second rotating portion 72. A central axis A3 of the mounting hole is arranged to be deviated from a central axis of the outer circumferential surface 711 of the first rotating portion and a central axis of the outer circumferential surface 721 of the second rotating portion.

When the first adjusting member 30 is mounted in the mounting hole 73, the first adjusting member 30 may be completely accommodated in the mounting hole 73, or may be partially accommodated in the mounting hole 73.

As shown in FIG. 9 and FIG. 10, in some embodiments, the first adjusting member 30 includes a third rotating portion 31 and a fourth rotating portion 32. The third rotating portion 31 is connected to the fourth rotating portion 32. The third rotating portion 31 is of a cylindrical structure, and the fourth rotating portion 32 is a disc structure. An axis of the outer circumferential surface 311 of the third rotating portion coincides with an axis of an outer circumferential surface of the fourth rotating portion 32. The diameter of the outer circumferential surface 311 of the third rotating portion is smaller than the diameter of the outer circumferential surface 321 of the fourth rotating portion. The third rotating portion 31 is accommodated in the mounting hole 73, and the fourth rotating portion 32 is located outside the mounting hole 73 and located on one side of the first mounting portion 11 away from the third mounting portion 13.

In some embodiments, the first adjusting member 30 may also be of another structure, for example, the first adjusting member 30 is a structure with outer circumferential surfaces having equal diameters. Of course, the first adjusting member 30 may also be completely located in the mounting hole 73.

If the first adjusting member 30 is mounted in the mounting hole 73, the first adjusting member 30 is at least partially accommodated in the mounting hole 73, which is capable of reducing the overall size of the first adjusting member 30 and the second adjusting member 70 after mounting, thereby reducing the overall size of the roller assembly 100.

In some embodiments, the second adjusting member 70 sleeves the first adjusting member 30 peripherally.

In the embodiment where the second adjusting member 70 is completely accommodated in the mounting hole 73, in the axial direction of the mounting hole 73, the size of the first adjusting member 30 and the second adjusting member 70 after assembling is the size of the second adjusting member 70 in the axial direction of the mounting hole 73. In the embodiment where the second adjusting member 70 is partially accommodated in the mounting hole 73, in the axial direction of the mounting hole 73, the size of the first adjusting member 30 and the second adjusting member 70 after assembling is a sum of the size of the second adjusting member 70 in the axial direction of the mounting hole 73 and the size of the first adjusting member 30 outside the mounting hole 73.

The second adjusting member 70 sleeves the first adjusting member 30 peripherally, so that the first adjusting member 30 is at least partially accommodated in the mounting hole 73 circumferentially, which is capable of reducing the overall size of the first adjusting member 30 and the second adjusting member 70 after mounting, thereby reducing the overall size of the roller assembly 100.

In some embodiments, an edge of the first adjusting member 30 is provided with a notch (not shown) for mounting the first adjusting member 30. The first adjusting member 30 is partially or completely located in the notch, so that the first adjusting member 30 and the second adjusting member 70 are capable of cooperating to adjust the extension direction of the roller assembly 100, and are further capable of reducing the size of the first adjusting member 30 and the second adjusting member 70 after assembling.

In some embodiments, the outer circumferential surface of the first adjusting member 30 forms a rotational fit with the wall of the mounting hole 73.

In the embodiment where the first adjusting member 30 includes a third rotating portion 31 and a fourth rotating portion 32, the outer circumferential surface of the first adjusting member 30 forms a rotational fit with the hole wall of the mounting hole 73, which means that the outer circumferential surface of the third rotating portion 31 of the first adjusting member 30 forms a rotational fit with the hole wall of the mounting hole 73. The outer circumferential surface of the first adjusting member 30 forms a rotational fit with the wall of the mounting hole 73, which means that the outer circumferential surface of the first adjusting member 30 and the hole wall of the mounting hole 73 are directly attached and are capable of rotating relative to each other. Therefore, the rotation axis A1 of the first adjusting member coincides with the central axis A3 of the mounting hole. A distance between the rotation axis A2 of the second adjusting member and the rotation axis A1 of the first adjusting member is a distance between the rotation axis A2 of the second adjusting member and the central axis A3 of the mounting hole.

The outer circumferential surface of the first adjusting member 30 forms a rotational fit with the hole wall of the mounting hole 73, which is equivalent to that the outer circumferential surface of the first adjusting member 30 directly contacts with the hole wall of the mounting hole 73 and forms the rotational fit, without arranging a rotating member such as a bearing between the outer circumferential surface of the first adjusting member 30 and the hole wall of the mounting hole 73 to realize the rotatable mounting of the first adjusting member 30 on the second adjusting member 70, thereby simplifying the structure and the assembling process of the roller assembly 100, saving the manufacturing cost, and reducing the mounting error between the first adjusting member 30 and the second adjusting member 70 to improve the adjustment accuracy.

In some other embodiments, a bearing may further be arranged between the outer circumferential surface of the first adjusting member 30 and the hole wall of the mounting hole 73 to enable rotatable mounting of the first adjusting member 30 on the second adjusting member 70.

As shown in FIG. 9, in some embodiments, the roller assembly 100 includes a first locking mechanism 80, and the first locking mechanism 80 is configured to lock the second adjusting member 70 and the holder 10.

The first locking mechanism 80 is configured to lock the second adjusting member 70 and the holder 10, which means that a first locking member 81 is capable of preventing the second adjusting member 70 from rotating relative to the holder 10, so that the second adjusting member 70 and the holder 10 are relatively fixed. When the second adjusting member 70 is required to adjust the extension direction of the roller 20, the first locking mechanism 80 unlocks the second adjusting member 70 and the holder 10 so that the second adjusting member 70 is capable of rotating relative to the holder 10.

When the second adjusting member 70 adjusts the roller 20 to an appropriate extension direction, locking the second adjusting member 70 and the holder 10 by the first locking mechanism 80 is capable of fixing the second adjusting member 70 relative to the holder 10, so as to keep the roller 20 in an adjusted position and stable, and improving the stability of transferring.

There are many methods of locking the second adjusting member 70 and the holder 10. In some embodiments, the first locking mechanism 80 includes the first locking member 81. The holder 10 is provided with a first locking hole 112, the second adjusting member 70 is provided with a second locking hole 74, and the first locking member 81 is configured to be inserted into the first locking hole 112 and the second locking hole 74 to lock the second adjusting member 70 with the holder 10.

There may be one or a plurality of first locking holes 112. In the embodiment where there is one first locking hole 112, the first locking hole 112 may be an arc hole located at the outer circumference of the rotation axis A2 of the second adjusting member, that is, the first locking hole 112 is a hole that extends along an arc track extending around the rotation axis A2 of the second adjusting member. When rotating to any position, the second adjusting member 70 is capable of being locked through the first locking member 81. In the embodiment where there are a plurality of first locking holes 112, each first locking hole 112 is a circular hole, and the plurality of first locking holes 112 are arranged at intervals at the outer circumference of the rotation axis A2 of the second adjusting member.

In an embodiment where the second adjusting member 70 includes the first rotating portion 71 and the second rotating portion 72, the second locking hole 74 may be arranged on the second rotating portion 72 and penetrate the second rotating portion 72 in an axial direction of the second rotating portion 72. There may be one or a plurality of second locking holes 74. In the embodiment where there is one second locking hole 74, the second locking hole 74 may be an arc hole located at the outer circumference of the rotation axis A2 of the second adjusting member, that is, the second locking hole 74 is a hole that extends along an arc track extending around the rotation axis A2 of the second adjusting member. When rotating to any position, the second adjusting member 70 is capable of being locked through the first locking member 81. In the embodiment where there are a plurality of second locking holes 74, each second locking hole 74 is a strip hole, and the plurality of second locking holes 74 are arranged at intervals at the outer circumference of the rotation axis A2 of the second adjusting member.

The first locking member 81 may be a bolt, a screw, a pin, or the like.

The First locking member 81 cooperates with the first locking hole 112 on the holder 10 and the second locking hole 74 on the second adjusting member 70 to lock the second adjusting member 70 and the holder 10. The locking method is simple, and the arrangement of the first locking hole and the second locking hole is further capable of reducing the weight of the holder 10 and the second adjusting member 70.

As shown in FIG. 9, in some embodiments, the roller assembly 100 further includes a second locking mechanism 90, and the second locking mechanism 90 is configured to lock the first adjusting member 30 and the second adjusting member 70.

The second locking mechanism 90 is configured to lock the second adjusting member 70 and the first adjusting member 30, which means that a second locking member 91 is capable of preventing the first adjusting member 30 from rotating relative to the second adjusting member 70, so that the second adjusting member 70 and the first adjusting member 30 are relatively fixed. When the first adjusting member 30 is required to rotate relative to the second adjusting member 70 to adjust the extension direction of the roller 20, the second locking mechanism 90 unlocks the second adjusting member 70 and the first adjusting member 30 so that the first adjusting member 30 is capable of rotating relative to the second adjusting member 70.

There are many methods of locking the first adjusting member 30 and the second adjusting member 70. For example, in some embodiments, the second locking mechanism 90 includes the second locking member 91. The second adjusting member 70 is provided with a third locking hole 75, the first adjusting member 30 is provided with a fourth locking hole 34, and the second locking member 91 is configured to be inserted into the third locking hole 75 and the fourth locking hole 34 to lock the first adjusting member 30 and the second adjusting member 70.

In an embodiment where the second adjusting member 70 includes the first rotating portion 71 and the second rotating portion 72, the third locking hole 75 may be arranged on the second rotating portion 72 and penetrate the second rotating portion 72 in the axial direction of the second rotating portion 72. There may be one or a plurality of third locking holes 75. In the embodiment where there is one third locking hole 75, the third locking hole 75 may be an arc hole arranged on the second adjusting member 70 and located on the outer circumference of the rotation axis A2 of the second adjusting member, that is, the third locking hole 75 is a hole that extends along an arc track extending around the rotation axis A2 of the second adjusting member. When rotating to any position, the first adjusting member 30 is capable of being locked through the second locking member 91. In the embodiment where there are a plurality of third locking holes 75, each third locking hole 75 is a circular hole, and the plurality of third locking holes 75 are arranged at intervals at the outer circumference of the rotation axis A2 of the second adjusting member.

There may be one or a plurality of fourth locking holes 34. In the embodiment where there is one fourth locking hole 34, the fourth locking hole 34 may be an arc hole located at the outer circumference of the rotation axis A1 of the first adjusting member, that is, the fourth locking hole 34 is a hole that extends along an arc track extending around the rotation axis A1 of the first adjusting member. When rotating to any position, the first adjusting member 30 is capable of being locked through the second locking member 91. In the embodiment where there are a plurality of fourth locking holes 34, each fourth locking hole 34 is a strip hole, and the plurality of fourth locking holes 34 are arranged at intervals on the fourth rotating portion 32 of the first adjusting member 30.

The second locking member 91 may be a bolt, a screw, a pin, or the like.

The second locking member 91 cooperates with the third locking hole 75 on the second adjusting member 70 and the fourth locking hole 34 on the first adjusting member 30 to lock the first adjusting member 30 and the second adjusting member 70. The locking method is simple, and the arrangement of the third locking hole 75 and the fourth locking hole 34 is further capable of reducing the weight of the second adjusting member 70 and the first adjusting member 30. For another example, the second locking mechanism 90 includes a first buckle portion (not shown) and a second buckle portion (not shown). The first buckle portion is hinged to one of the first adjusting member 30 and the second adjusting member 70. The second buckle portion is arranged to the other of the first adjusting member 30 and the second adjusting member 70. The first buckle portion and the second buckle portion cooperate to achieve the locking of the first adjusting member 30 and the second adjusting member 70.

When the first adjusting member 30 adjusts the roller 20 to a suitable extension direction, locking the second adjusting member 70 and the first adjusting member 30 through the second locking mechanism 90 is capable of fixing the first adjusting member 30 relative to the second adjusting member 70, thereby keeping the roller 20 in an adjusted position and stable, and improving the stability of transferring.

As shown in FIG. 9, in some embodiments, an axis (not shown) of the second adjusting member 70 coincides with the rotation axis A2 (shown in FIG. 3) of the second adjusting member.

In the embodiment where the second adjusting member 70 includes the first rotating portion 71 and the second rotating portion 72, the axis of the second adjusting member 70 coincides with the rotation axis A2 of the second adjusting member, which means that the axis of the first rotating portion 71 of the second adjusting member 70 coincides with the rotation axis A2 of the second adjusting member. The rotation axis A2 of the second adjusting member coincides with a central axis of the second accommodating hole 111.

The central axis of the first rotating portion 71 is a geometric centerline of the first rotating portion 71. In the embodiment where the second adjusting member 70 is provided with a mounting hole 73, the geometric center of the first rotating portion 71 coincides with the axis of the outer circumferential surface 711 of the first rotating portion, and the central axis A3 of the mounting hole 73 is arranged to be deviated from the axis of the outer circumferential surface 711 of the first rotating portion.

The axis of the second adjusting member 70 coincides with the rotation axis A2 (shown in FIG. 3) of the second adjusting member, and therefore, the second adjusting member 70 has a regular structure and is more convenient for adjustment.

As shown in FIG. 9, in some embodiments, the first adjusting member 30 is provided with an assembling hole 33, and the assembling hole 33 is configured to mount the roller 20.

The roller 20 is mounted in the assembling hole 33. In fact, one end of the roller 20 is mounted in the assembling hole 33, so that the roller 20 is rotatably mounted on the first adjusting member 30. The roller 20 may be directly mounted in the assembling hole and form a rotation fit with a hole wall of the assembling hole 33. The roller 20 may also be indirectly mounted in the assembling hole. For example, one end of the roller 20 is rotatably mounted in the assembling hole 33 through a fourth bearing 110, so that the roller 20 is rotatably mounted in the first adjusting member 30. The bearing may be a self-aligning bearing. In the embodiment where one end of the roller 20 is mounted in the assembling hole through the fourth bearing 110, the roller assembly 100 further includes a fourth position-limit member 120, and the fourth position-limit member 120 is used for limiting a position of the fourth bearing 110 in the axial direction.

In the embodiment where the first adjusting member 30 includes the third rotating portion 31 and the fourth rotating portion 32, the assembling hole may be arranged only on the third rotating portion 31, and a central axis A4 of the assembling hole may be arranged to be deviated from the axis of the outer circumferential surface 311 of the third rotating portion.

The first adjusting member 30 is provided with the assembling hole for mounting the roller 20. In other words, mounting one end of the roller 20 in the assembling hole is capable of reducing the overall size of the first adjusting member 30 and the roller 20 after mounting, thereby reducing the overall size of the roller assembly 100.

In some embodiments, a distance between the central axis A4 of the assembling hole and the rotation axis A1 of the first adjusting member is equal to a distance between the central axis A3 of the mounting hole and the rotation axis A2 of the second adjusting member.

Figure 11:
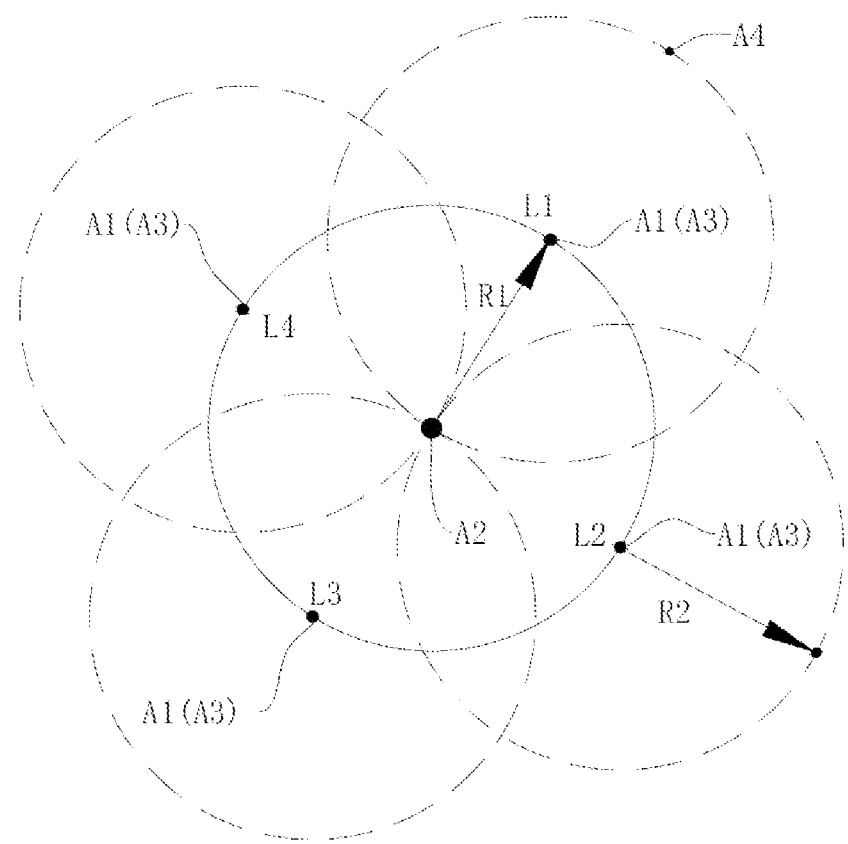
FIG. 11 is a schematic diagram of an adjustment range of a first adjusting member and a second adjusting member of a roller assembly according to some embodiments of the present application.

Referring to FIG. 11, FIG. 11 is a schematic diagram of an adjustment range of the first adjusting member 30 and the second adjusting member 70 of the roller assembly 100 according to some embodiments of the present application. In the figure, a solid line circle has radius R1 being a distance between the rotation axis A1 of the first adjusting member (i.e., the central axis A3 of the mounting hole) and the rotation axis A2 of the second adjusting member. The solid line circle is a motion track of the rotation axis A1 of the first adjusting member during the rotation of the second adjusting member 70, and L1, L2, . . . , and LN refer to different arrival positions of the first adjusting member 30 driven by the second adjusting member 70. The figure shows only four positions of the rotation axis A1 of the first adjusting member on its motion track, namely, L1, L2, L3, and L4. In the figure, a dotted circle has radius R2 being a distance between the rotation axis A1 of the first adjusting member and the central axis A4 of the assembling hole. When R1=R2, cooperative adjustment of the first adjusting member 30 and the second adjusting member 70 is capable of adjusting the central axis A4 of the assembling hole to any position within a circle with a radius as a sum of R1+R1.

The distance between the central axis A4 of the assembling hole and the rotation axis A1 of the first adjusting member is equal to the distance between the central axis A3 of the mounting hole (the rotation axis A1 of the first adjusting member) and the rotation axis A2 of the second adjusting member. Therefore, under the cooperative operation of the first adjusting member 30 and the second adjusting member 70, one end of the roller 20 mounted on the first adjusting member 30 is capable of being adjusted to any position in the circle with the radius as the sum of the distance between the central axis A4 of the assembling hole and the rotation axis A1 of the first adjusting member and the distance between the central axis A3 of the mounting hole and the rotation axis A2 of the second adjusting member, so that the extension direction of the roller 20 has a larger adjustment range and higher adjustment accuracy.

In some embodiments, the distance between the central axis A4 of the assembling hole and the rotation axis A1 of the first adjusting member is greater than the distance between the central axis A3 of the mounting hole and the rotation axis A2 of the second adjusting member.

Figure 12:
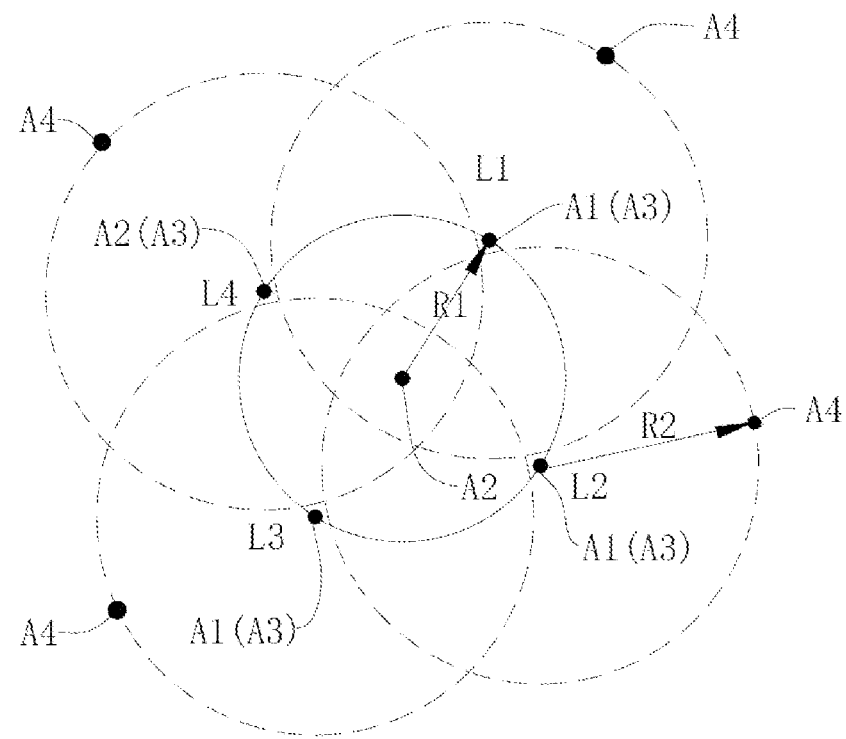
FIG. 12 is a schematic diagram of an adjustment range of a first adjusting member and a second adjusting member of a roller assembly according to other embodiments of the present application.

Referring to FIG. 12, FIG. 12 is a schematic diagram of an adjustment range of the first adjusting member 30 and the second adjusting member 70 of the roller assembly 100 according to other embodiments of the present application. In the figure, a solid line circle has radius R1 being a distance between the rotation axis A1 of the first adjusting member (i.e., the central axis A3 of the mounting hole) and the rotation axis A2 of the second adjusting member. The solid line circle is a motion track of the rotation axis A1 of the first adjusting member during the rotation of the second adjusting member 70, and L1, L2, . . . , and LN refer to different arrival positions of the first adjusting member 30 driven by the second adjusting member 70. The figure shows only four positions of the rotation axis A1 of the first adjusting member on its motion track, namely, L1, L2, L3, and L4. In the figure, a dotted circle has radius R2 being a distance between the rotation axis A1 of the first adjusting member and the central axis A4 of the assembling hole. When R1<R2, cooperative adjustment of the first adjusting member 30 and the second adjusting member 70 is capable of adjusting the central axis A4 of the assembling hole to the range as shown in FIG. 7.

In some embodiments, the distance between the central axis A4 of the assembling hole and the rotation axis A1 of the first adjusting member is less than the distance between the central axis A3 of the mounting hole and the rotation axis A2 of the second adjusting member.

Figure 13:
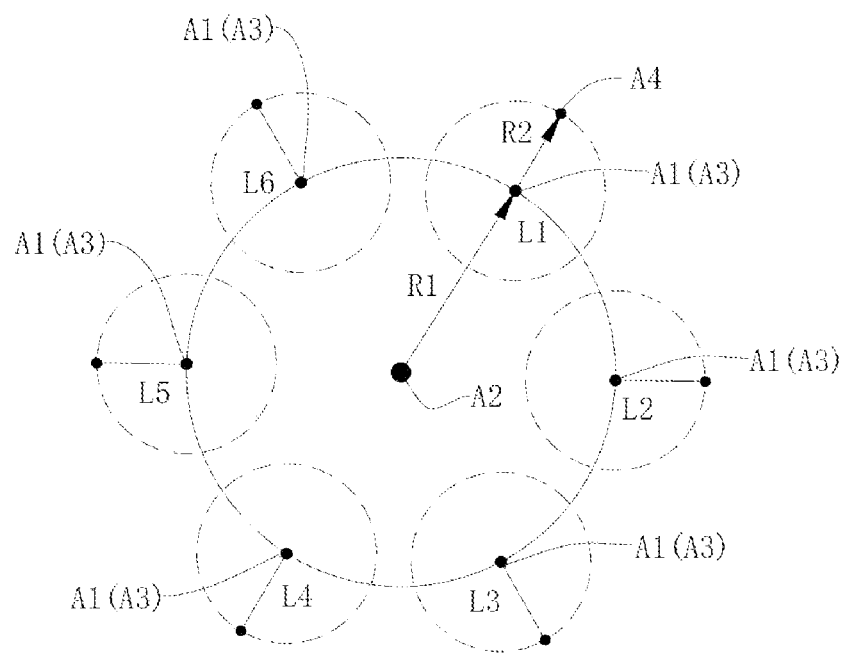
FIG. 13 is a schematic diagram of an adjustment range of a first adjusting member and a second adjusting member of a roller assembly according to still other embodiments of the present application.

Referring to FIG. 13, FIG. 13 is a schematic diagram of an adjustment range of the first adjusting member 30 and the second adjusting member 70 of the roller assembly 100 according to still other embodiments of the present application. In the figure, a solid line circle has radius R1 being a distance between the rotation axis A1 of the first adjusting member (i.e., the central axis A3 of the mounting hole) and the rotation axis A2 of the second adjusting member. The solid line circle is a motion track of the rotation axis A1 of the first adjusting member during the rotation of the second adjusting member 70, and L1, L2, . . . , and LN (N is a natural number greater than or equal to 1) refer to different arrival positions of the first adjusting member 30 driven by the second adjusting member 70. The figure shows only six positions of the rotation axis A1 of the first adjusting member on its motion track, namely, L1, L2, L3, L4, L5, and L6. In the figure, a dotted circle has radius R2 being a distance between the rotation axis A1 of the first adjusting member and the central axis A4 of the assembling hole. When R1>R2, cooperative adjustment of the first adjusting member 30 and the second adjusting member 70 is capable of adjusting the central axis A4 of the assembling hole to any position in a ring formed by a circle with radius R1+R2 and a circle with radius R1-R2 that are arranged coaxially.

As shown in FIG. 9, in some embodiments, the axis of the outer circumferential surface of the first adjusting member 30 (not shown) coincides with the rotation axis A1 of the first adjusting member.

In the embodiment where the first adjusting member 30 includes the third rotating portion 31 and the fourth rotating portion 32, the central axis of the outer circumferential surface 311 of the third rotating portion of the first adjusting member 30 coincides with the rotation axis A1 of the first adjusting member. In the embodiment where the first adjusting member 30 is provided with the assembling hole 33, the central axis A4 of the assembling hole is arranged to be deviated from the central axis of the outer circumferential surface 311 of the third rotating portion of the first adjusting member 30.

The axis of the outer circumferential surface of the first adjusting member 30 coincides with the rotation axis A1 of the first adjusting member, and therefore, the first adjusting member 30 has a regular structure and is more convenient to mount and adjust.

In some embodiments, the roller assembly 100 includes third locking mechanism (not shown), and the third locking mechanism is configured to lock the first adjusting member 30 and the holder 10.

The third locking mechanism is configured to lock the first adjusting member 30 and the holder 10, which means that the third locking mechanism is capable of preventing the first adjusting member 30 from rotating relative to the holder 10, so that the first adjusting member 30 and the holder 10 are relatively fixed. When the first adjusting member 30 is required to rotate relative to the holder 10 to adjust the extension direction of the roller 20, the third locking mechanism unlocks the first adjusting member 30 and the holder 10 so that the first adjusting member 30 is capable of rotating relative to the second adjusting member 70.

The third locking mechanism includes a third buckle portion (not shown) and a fourth buckle portion (not shown). The third buckle portion is hinged to one of the first adjusting member 30 and the holder 10. The fourth buckle portion is arranged to the other of the first adjusting member 30 and the holder 10. The first buckle portion and the second buckle portion cooperate to achieve the locking of the first adjusting member 30 and the holder 10.

In the embodiment where the roller assembly 100 only includes a first adjusting member 30, the third locking mechanism may be arranged with reference to the first locking mechanism 80.

The third locking mechanism is configured to lock the first adjusting member 30 and the holder 10. When a third adjusting member adjusts the roller 20 to a suitable extension direction, locking the second adjusting member 70 and the holder 10 by the first locking mechanism 80 is capable of fixing the first adjusting member 30 relative to the holder 10, thereby keeping the roller 20 in an adjusted position and stable, and improving the stability of transferring.

Figure 14:
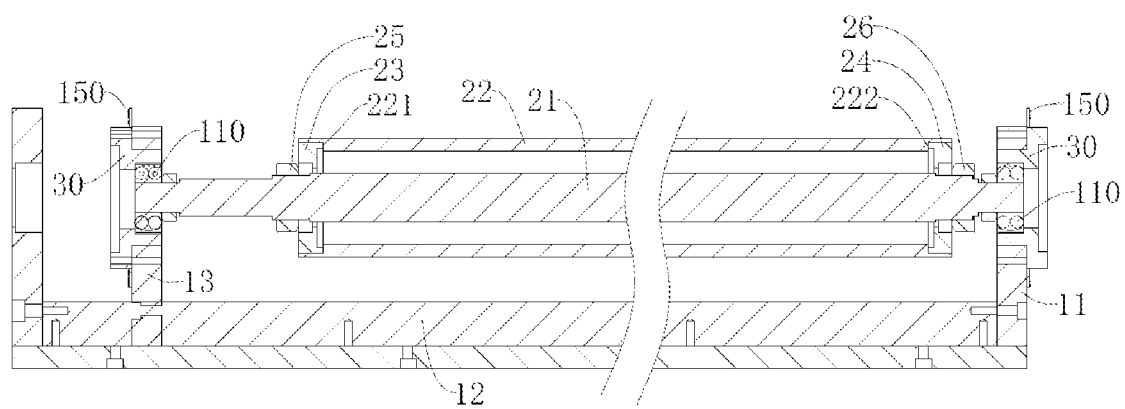
FIG. 14 is a sectional diagram of a roller assembly according to other embodiments of the present application.

Referring to FIG. 14, FIG. 14 is a sectional diagram of the roller assembly 100 according to other embodiments of the present application. In some embodiments, the roller assembly 100 includes two first adjusting members 30, and both ends of the roller 20 are mounted on the holder 10 through two first adjusting members 30 respectively.

Both ends of the roller 20 are mounted on the holder 10 through two first adjusting members 30 respectively, that is, the roller 20 may be adjusted at both ends of the roller 20.

The first adjusting member 30 is mounted on the holder 10 through the fourth bearing 110. One first adjusting member 30 of first adjusting members 30 is rotatably mounted on the first mounting portion 11 of the holder 10, and the other first adjusting member 30 of the first adjusting member 30 is rotatably mounted on the third mounting portion 13 of the holder 10.

Both ends of the roller 20 are respectively mounted on the holder 10 through the first adjusting member 30. The extension direction of the roller 20 may be adjusted through the first adjusting member 30 at either end, thereby providing more options for the adjustment of the extension direction of the roller 20, so that it is convenient to choose, according to an actual use environment, an end of the roller 20 for adjustment. First adjusting members 30 at both ends of the roller 20 may also be adjusted at the same time. Cooperative adjustment of two first adjusting members 30 on the extension direction of the roller 20 is capable of improving the adjustment efficiency.

Figure 15:
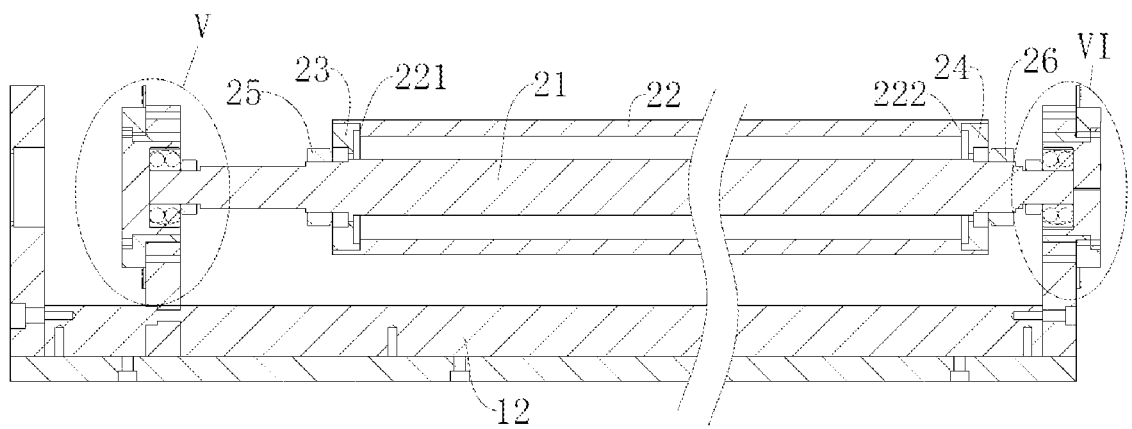
FIG. 15 is a sectional diagram of a roller assembly according to still other embodiments of the present application.
Figure 16:
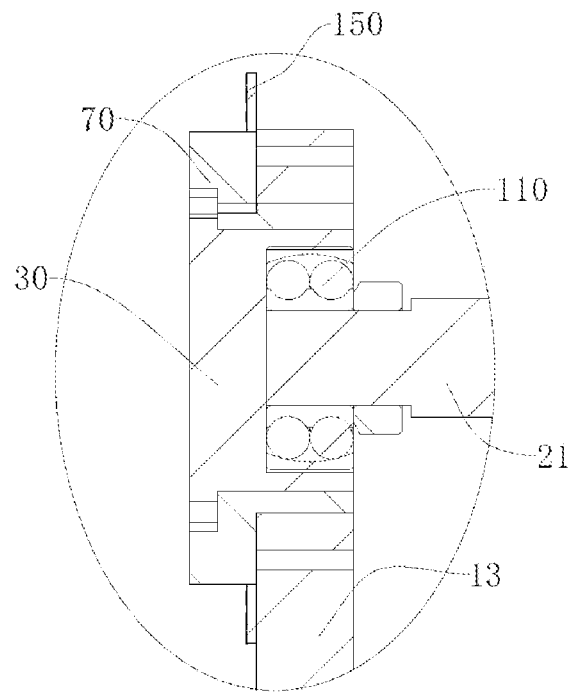
FIG. 16 is an enlarged diagram at position V in FIG. 15.
Figure 17:
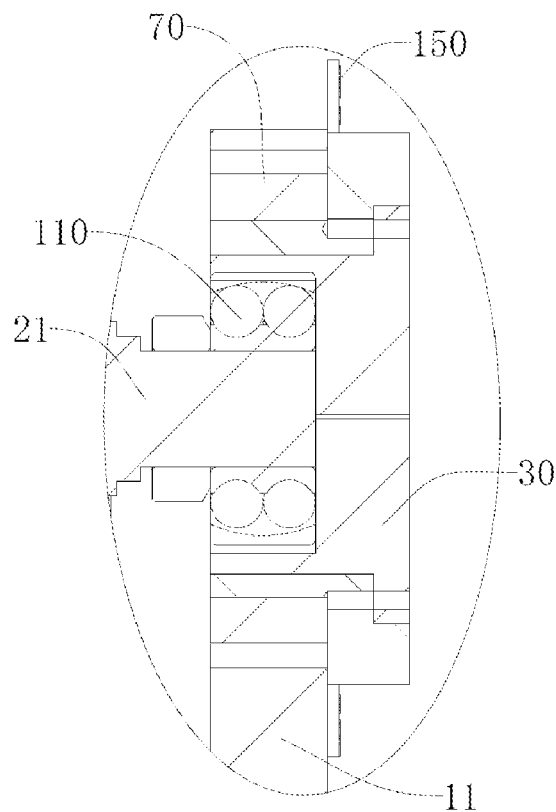
FIG. 17 is an enlarged diagram at position VI in FIG. 15.

Referring to FIG. 15 to FIG. 17, FIG. 15 is a sectional diagram of the roller assembly 100 according to still other embodiments of the present application, FIG. 16 is an enlarged diagram at position V in FIG. 15, and FIG. 17 is an enlarged diagram at position VI in FIG. 15. In some embodiments, the roller assembly 100 may include two second adjusting members 70, and two first adjusting members 30 are rotatably mounted on the holder 10 through two second adjusting members 70 respectively. Of course, both ends of the roller 20 may also be provided with first adjusting members 30 only.

Figure 18:
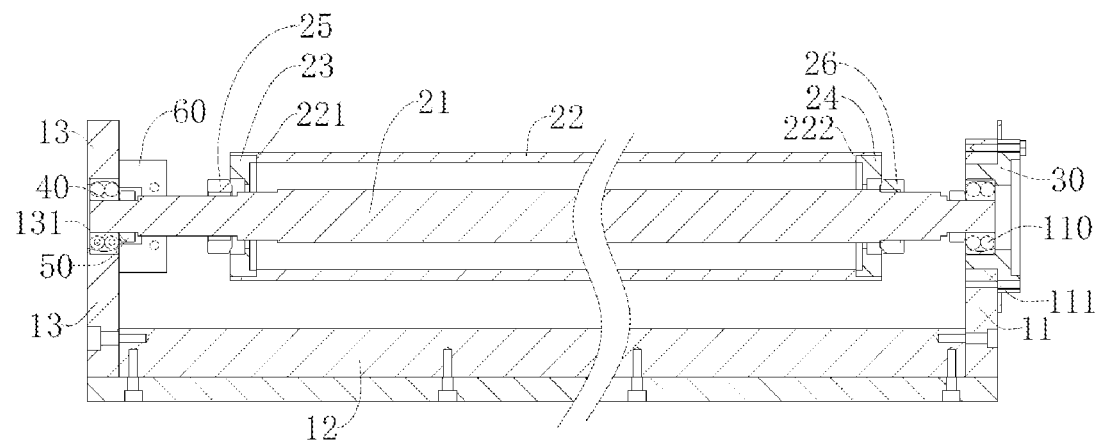
FIG. 18 is a sectional diagram of a roller assembly according to yet other embodiments of the present application.

Referring to FIG. 18, FIG. 18 is a sectional diagram of the roller assembly 100 according to some embodiments of the present application. In some embodiments, the roller assembly 100 includes only one first adjusting member 30, one end of the shaft 21 of the roller 20 is rotatably mounted in the second accommodating hole 111 of the first mounting portion 11 of the holder 10 through the first adjusting member 30, and the other end of the shaft 21 of the roller 20 is mounted in the first accommodating hole 131 of the third mounting portion 13 of the holder 10 through the third bearing 40.

Figure 19:
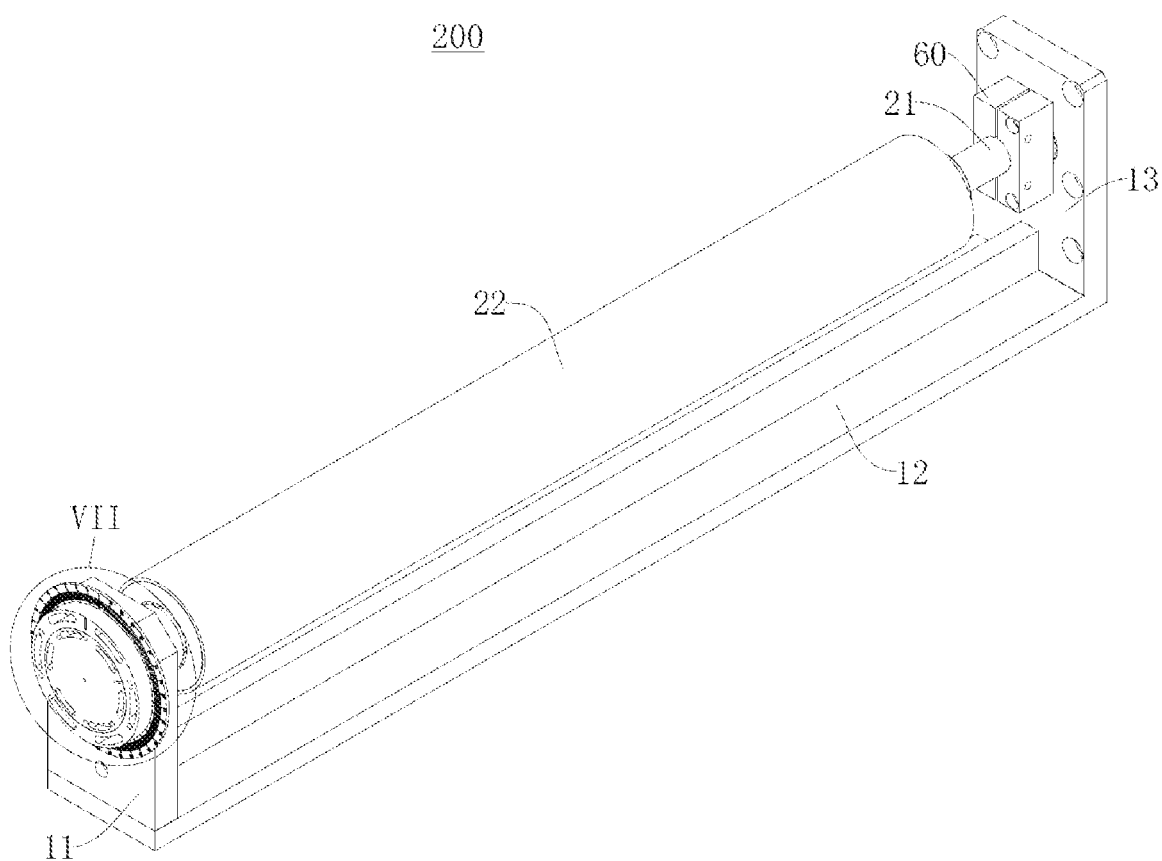
FIG. 19 is a schematic structural diagram of a roller assembly from another perspective according to some embodiments of the present application.
Figure 20:
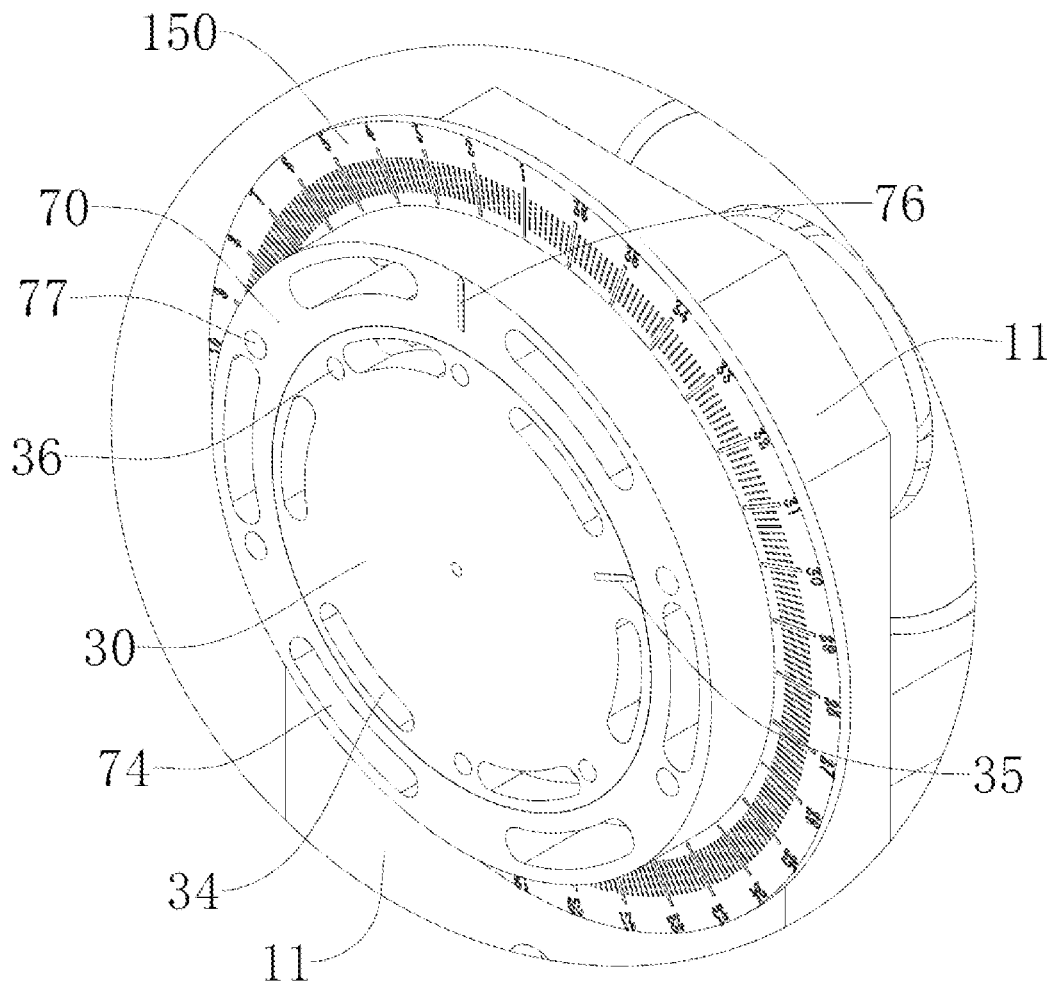
FIG. 20 is an enlarged diagram at position VII in FIG. 19.

Referring to FIG. 19 and FIG. 20, FIG. 19 is a schematic structural diagram of the roller assembly 100 from another perspective according to some embodiments of the present application, and FIG. 20 is an enlarged diagram at position VII in FIG. 19. In some embodiments, the roller assembly 100 further includes a measuring member 150, the measuring member 150 is mounted on the holder 10, and the measuring member 150 is configured to measure a rotation angle of the first adjusting member 30. As shown in FIG. 20, in some embodiments, the measuring member 150 is a dial mounted on the holder 10, the first adjusting member 30 is provided with a first identification 35, the second adjusting member 70 is provided with a second identification 76, the first identification 35 and the second identification 76 indicate scale values on the dial, and rotation angles of the first adjusting member 30 and the second adjusting member 70 is capable of being obtained according to the scale values indicated by the first identification 35 and the second identification 76.

The first identification 35 and the second identification 76 may both be indicating arrows.

In other embodiments, the measuring member 150 may also be a scale engraved on the holder 10.

The arrangement of the measuring member 150 is convenient for measuring the rotation angle of the first adjusting member 30. In the embodiment with a plurality of roller assemblies 100, the measuring member 150 may also provide a reference for the adjustment of the extension direction of the roller 20 of another roller assembly 100, so as to ensure that extension directions of various rollers 20 are consistent, thereby improving the transferring stability.

As shown in FIG. 20, in some embodiments, the first adjusting member 30 is further provided with a first handle hole 36, and the first handle hole 36 is used for mounting a handle and is capable of driving the first adjusting member 30 to rotate through the handle. The second adjusting member 70 is further provided with a second handle hole 77, and the second handle hole 77 is used for mounting a handle and is capable of driving the second adjusting member 70 to rotate through the handle. The first handle hole 36 and the second handle hole 77 may both be threaded holes. In the embodiment where the first adjusting member 30 includes the third rotating portion 31 and the fourth rotating portion 32, the first handle hole 36 is arranged on the fourth rotating portion 32. In the embodiment where the second adjusting member 70 includes the first rotating portion 71 and the second rotating portion 72, the second handle hole 77 is arranged on the second rotating portion 72.

Referring to FIG. 5 and FIG. 6, a roller assembly 100 is provided in some embodiments of the present application, and the roller assembly 100 includes a holder 10, the roller 20, the first adjusting member 30, and the second adjusting member 70. The holder 10 includes a first mounting portion 11, a second mounting portion 12, and a third mounting portion 13 connected in sequence. The first mounting portion 11 and the third mounting portion 13 are arranged oppositely. The first mounting portion 11, the second mounting portion 12, and the third mounting portion 13 jointly define a U-shaped holder 10.

The second adjusting member 70 is rotatably mounted on the third mounting portion 13 of the holder 10. The second adjusting member 70 is provided with a mounting hole 73. The central axis A3 of the mounting hole is arranged to be deviated from the rotation axis A2 of the second adjusting member. The first adjusting member 30 is rotatably mounted in the mounting hole 73. The first adjusting member 30 is provided with an assembling hole. One end of the roller 20 is mounted in the assembling hole through a self-aligning bearing. The central axis A4 of the assembling hole is arranged to be deviated from the rotation axis A1 of the first adjusting member, and the other end of the roller 20 is mounted on the third mounting portion 13 of the holder 10 through the self-aligning bearing.

A battery cell manufacturing device 1000 is further provided in some embodiments of the present application, and the battery cell manufacturing device 1000 includes the feeding apparatus 200 and the roller assembly 100 according to any of the above embodiments. The feeding apparatus 200 is used for providing the electrode sheet 3000. The roller 20 of the roller assembly 100 is configured to transfer the electrode sheet 3000.

Figure 21:
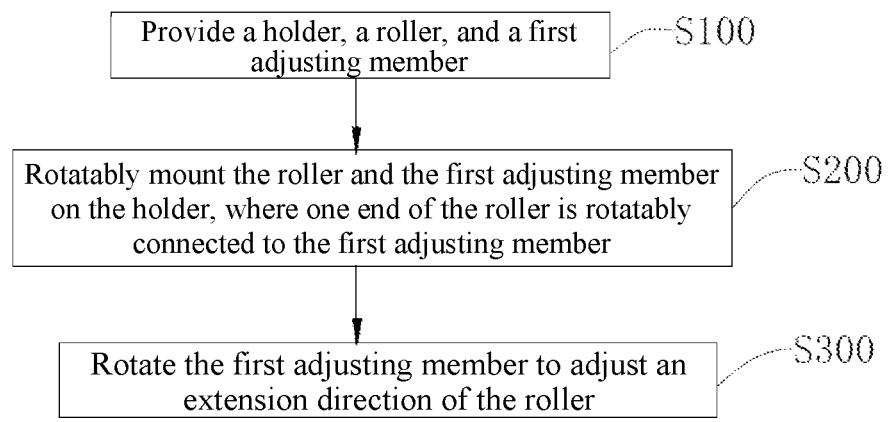
FIG. 21 is a flow chart of an adjustment method of a roller according to some embodiments of the present application.

Referring to FIG. 21, FIG. 21 is a flowchart of an adjustment method of a roller 20 according to some embodiments of the present application. An adjustment method of a roller 20 is further provided in some embodiments of the present application, and the adjustment method of the roller 20 includes:

Step S100: Provide a holder 10, a roller 20, and a first adjusting member 30;

Step S200: Rotatably mount the roller 20 and the first adjusting member 30 on the holder 10, where one end of the roller 20 is rotatably connected to the first adjusting member 30, so that a rotation axis of the roller 20 does not coincide with the rotation axis A1 of the first adjusting member; and Step S300: Rotate the first adjusting member 30 to adjust an extension direction of the roller 20.

By rotating the first adjusting member 30 to adjust the extending direction of the roller 20, the extension direction of the roller 20 can meet the transferring requirement, thus ensuring the transferring stability. Moreover, a rotation range of the first adjusting member 30 is 0° to 360°, so that the extension direction of the roller 20 has a larger adjustment range and higher adjustment accuracy.

Figure 22:
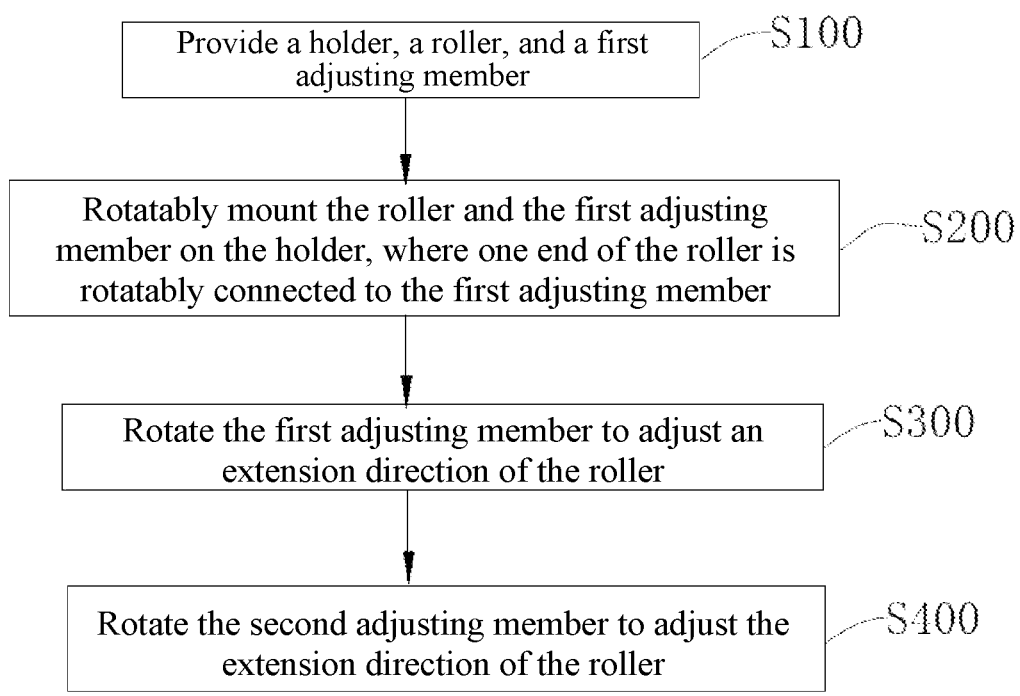
FIG. 22 is a flow chart of an adjustment method of a roller according to other embodiments of the present application.

Referring to FIG. 22, FIG. 22 is a flowchart of an adjustment method of a roller 20 according to other embodiments of the present application. In some embodiments, the adjustment method of a roller 20 further includes:

Step S400: Rotate the second adjusting member 70 to adjust the extension direction of the roller 20.

The implementation order of step S300 and step S400 is not limited in the embodiments of the present application. Step S300 may be performed first, then step S400 is performed, or step S400 may be performed first, and then step S300 is performed, which should be selected according to actual working conditions.

The above are only preferred embodiments of the present application, and are not intended to limit the present application. For those skilled in the art, the present application may have various modifications and changes. Any modifications, equivalent replacements, improvements, and the like made within the spirit and principle of the present application shall be included within the protection scope of the present application.

The invention claimed is:

1. A roller assembly comprising:
   a holder;
   a roller rotatably mounted on the holder;
   a first adjusting member rotatably mounted on the holder, one end of the roller being rotatably connected to the first adjusting member;
   a second adjusting member, wherein the first adjusting member is mounted on the holder through the second adjusting member, the second adjusting member is rotatably mounted on the holder, and the first adjusting member is rotatably mounted on the second adjusting member;
   a rotation axis of the second adjusting member does not coincide with a rotation axis of the first adjusting member; and
   a first locking mechanism, and the first locking mechanism is configured to lock the second adjusting member and the holder; and
   wherein a rotation axis of the roller does not coincide with the rotation axis of the first adjusting member.

2. The roller assembly according to claim 1, wherein the second adjusting member is provided with a mounting hole, and the mounting hole is used for mounting the first adjusting member.

3. The roller assembly according to claim 2 wherein the second adjusting member sleeves the first adjusting member peripherally.

4. The roller assembly according to claim 2, wherein an outer circumferential surface of the first adjusting member forms a rotational fit with a wall of the mounting hole.

5. The roller assembly according to claim 2, wherein the first adjusting member is provided with an assembling hole, and the assembling hole is configured to mount the roller.

6. The roller assembly according to claim 5, wherein a distance between a central axis of the assembling hole and the rotation axis of the first adjusting member is equal to a distance between a central axis of the mounting hole and the rotation axis of the second adjusting member.

7. The roller assembly according to claim 1, wherein the first locking mechanism comprises a first locking member;
the holder is provided with a first locking hole, the second adjusting member is provided with a second locking hole, and the first locking member is configured to be inserted into the first locking hole and the second locking hole to lock the second adjusting member and the holder.

8. The roller assembly according to claim 1, wherein the roller assembly further comprises a second locking mechanism, and the second locking mechanism is configured to lock the first adjusting member and the second adjusting member.

9. The roller assembly according to claim 8, wherein the second locking mechanism comprises a second locking member;
the second adjusting member is provided with a third locking hole, the first adjusting member is provided with a fourth locking hole, and the second locking member is configured to be inserted into the third locking hole and the fourth locking hole to lock the first adjusting member and the second adjusting member.

10. The roller assembly according to claim 1, wherein an axis of the second adjusting member coincides with the rotation axis of the second adjusting member.

11. The roller assembly according to claim 1, wherein an axis of an outer circumferential surface of the first adjusting member coincides with the rotation axis of the first adjusting member.

12. The roller assembly according to claim 1, wherein the roller assembly comprises a third locking mechanism, and the third locking mechanism is configured to lock the first adjusting member and the holder.

13. The roller assembly according to claim 1, wherein the first adjusting member is a first adjusting member and the roller assembly further comprises a second first adjusting member, and both ends of the roller are respectively mounted on the holder through the two first adjusting members.

14. The roller assembly according to claim 1, wherein the roller assembly further comprises a measuring member, the measuring member is mounted on the holder, and the measuring member is configured to measure a rotation angle of the first adjusting member.

15. A battery cell manufacturing device, comprising:
a feeding apparatus for providing an electrode sheet; and
a roller assembly according to claim 1, wherein a roller of the roller assembly is configured to transfer the electrode sheet.

16. An adjustment method of a roller, comprising:
providing a holder, the roller, a first adjusting member, a second adjusting member and a first locking mechanism;
rotatably mounting the roller and the first adjusting member on the holder, and rotatably mounting one end of the roller to the first adjusting member, so that a rotation axis of the roller does not coincide with a rotation axis of the first adjusting member, wherein the first adjusting member is mounted on the holder through the second adjusting member, the second adjusting member is rotatably mounted on the holder, and the first adjusting member is rotatably mounted on the second adjusting member, and a rotation axis of the second adjusting member does not coincide with the rotation axis of the first adjusting member;
locking the second adjusting member and the holder; and
rotating the first adjusting member to adjust an extension direction of the roller.

* * * * *